United States Patent
Thomas

(10) Patent No.: US 12,506,595 B2
(45) Date of Patent: Dec. 23, 2025

(54) DATA SECURITY METHODS

(71) Applicant: Klarytee Ltd, London (GB)

(72) Inventor: Nithin Thomas, London (GB)

(73) Assignee: Klarytee Ltd, London (GB)

( * ) Notice: Subject to any disclaimer, the term of this patent is extended or adjusted under 35 U.S.C. 154(b) by 255 days.

(21) Appl. No.: 18/259,199

(22) PCT Filed: Dec. 22, 2021

(86) PCT No.: PCT/EP2021/087317
§ 371 (c)(1),
(2) Date: Jun. 23, 2023

(87) PCT Pub. No.: WO2022/136559
PCT Pub. Date: Jun. 30, 2022

(65) Prior Publication Data
US 2024/0056291 A1    Feb. 15, 2024

(30) Foreign Application Priority Data
Dec. 24, 2020  (GB) .................................. 2020604

(51) Int. Cl.
*H04L 9/08*     (2006.01)
*G06F 21/62*    (2013.01)

(52) U.S. Cl.
CPC ........ *H04L 9/0825* (2013.01); *G06F 21/6209* (2013.01); *H04L 9/0891* (2013.01)

(58) Field of Classification Search
CPC . H04L 9/0825; H04L 9/0891; G06F 21/6209; G06F 21/602; G06F 21/62
See application file for complete search history.

(56) References Cited

U.S. PATENT DOCUMENTS

| | | | |
|---|---|---|---|
| 9,411,976 B2* | 8/2016 | Irvine | H04L 63/0421 |
| 9,682,590 B1* | 6/2017 | Ramarao | G06Q 10/00 |
| 11,250,142 B1* | 2/2022 | Wu | H04L 9/0819 |
| 2010/0064354 A1* | 3/2010 | Irvine | H04L 63/08 726/28 |

(Continued)

OTHER PUBLICATIONS

EPO, International Search Report and Written Opinion issued on PCT application No. PCT/EP2021/087317, dated Apr. 21, 2022, 12 pages.

(Continued)

*Primary Examiner* — J. Brant Murphy
(74) *Attorney, Agent, or Firm* — Greenberg Traurig, LLP

(57) ABSTRACT

Data security methods are described. In response to determining that a part of a data item is encrypted, a request for a decryption key associated with the part of the data item is sent from a first client device to a remote computing device. The first client device, or a second client device associated with the first client device, receives the decryption key associated with the marker, obtains the encrypted data and decrypts the encrypted data using the decryption key. The decrypted data is only temporarily output, for a period of an output session, in a position of the encrypted part of the data item and the decryption key and decrypted data may be discarded after the output session. The encrypted data may be contained within the data item or may be requested from a remote computing device based on a marker within the data item.

16 Claims, 17 Drawing Sheets

(56) References Cited

U.S. PATENT DOCUMENTS

| | | | | |
|---|---|---|---|---|
| 2014/0164772 A1* | 6/2014 | Forte | ............... | H04L 9/08 |
| | | | | 713/171 |
| 2014/0237614 A1* | 8/2014 | Irvine | ............... | H04L 63/083 |
| | | | | 726/26 |
| 2015/0006895 A1* | 1/2015 | Irvine | ............... | G06F 21/6209 |
| | | | | 713/171 |
| 2015/0088723 A1* | 3/2015 | Acuna-Rohter | ............... | H04L 9/14 |
| | | | | 705/37 |
| 2017/0005788 A1* | 1/2017 | Irvine | ............... | H04L 63/0428 |
| 2017/0163683 A1* | 6/2017 | van den Berghe | ............... | H04L 65/70 |
| 2018/0176193 A1* | 6/2018 | Davis | ............... | H04L 9/3247 |
| 2020/0099667 A1* | 3/2020 | Parthasarathy | ............... | G06F 21/6218 |

OTHER PUBLICATIONS

IPO, Examination Report issued on GB patent application No. 2020604.1, dated May 23, 2023, 6 pages.

\* cited by examiner

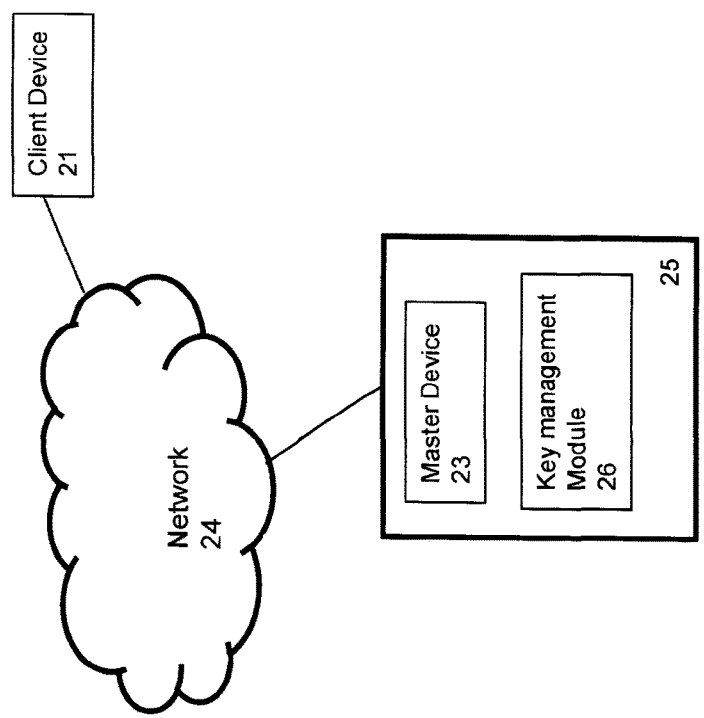
FIG. 2B
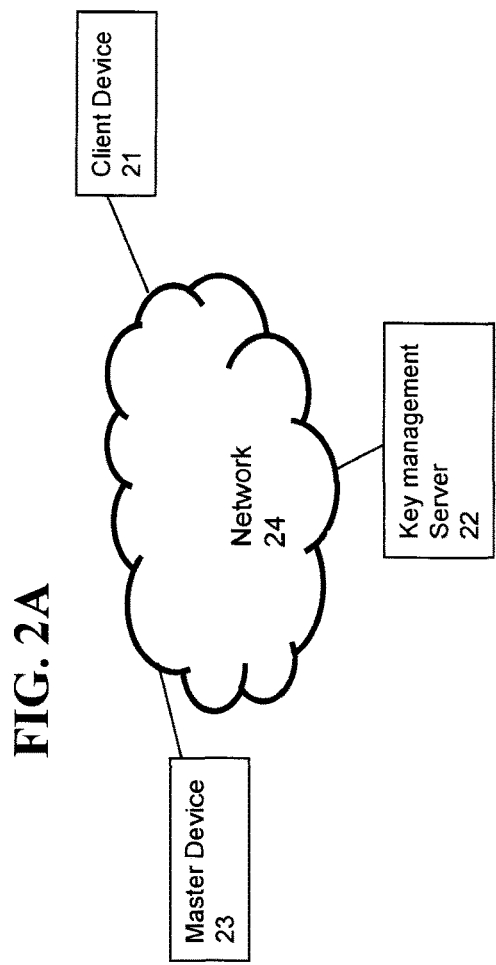
FIG. 2A
FIG. 2C

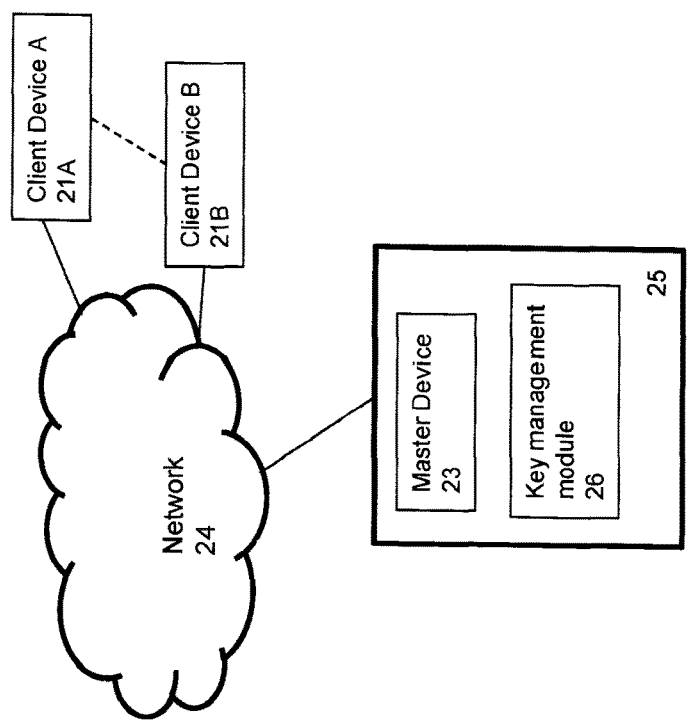
FIG. 2E
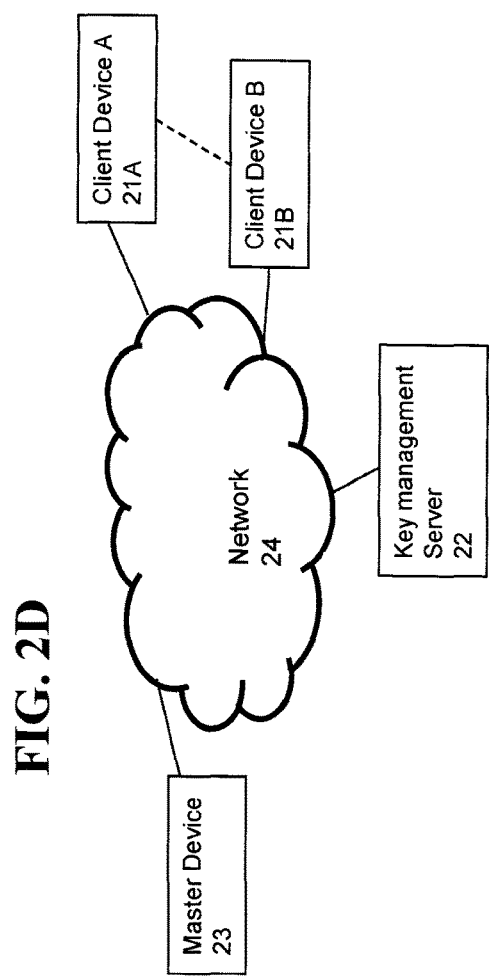
FIG. 2D
FIG. 2F

DATA SECURITY METHODS

CROSS REFERENCE TO RELATED APPLICATION

This application claims the benefit of a national stage application under 35 U.S.C. § 371 of International Application No. PCT/EP2021/087317, titled "Data Security Methods", filed Dec. 22, 2021, which claims priority to Application No. GB 2020604.1, filed Dec. 24, 2022, each of which are hereby incorporated by reference in their entirety.

BACKGROUND

There are many situations where maintaining security of data is important. The data may be sensitive (e.g. personal) data or it may be confidential information. As data is shared between users and devices, it becomes more susceptible to security breaches, e.g. as a consequence of passwords being hacked or accidentally disclosed, or through man-in-the-middle or other types of attack.

The embodiments described below are not limited to implementations which solve any or all of the disadvantages of known methods of data security.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Data security methods are described. In response to determining that a part of a data item is encrypted, a request for a decryption key associated with the part of the data item is sent from a first client device to a remote computing device. The first client device, or a second client device associated with the first client device, receives the decryption key associated with the marker, obtains the encrypted data and decrypts the encrypted data using the decryption key. The decrypted data is only temporarily output, for a period of an output session, in a position of the encrypted part of the data item and the decryption key and decrypted data may be discarded after the output session. The encrypted data may be contained within the data item or may be requested from a remote computing device based on a marker within the data item.

A first aspect provides a computer-implemented method comprising: in response to determining that a part of a data item is encrypted, sending a request for a decryption key associated with the part of the data item from a client device to a remote computing device; in response to receiving the decryption key associated with the marker and obtaining the encrypted data, decrypting the encrypted data using the decryption key; and temporarily outputting, for a period of an output session, the decrypted data in a position of the encrypted part of the data item.

A second aspect provides a computing device comprising: a processor; and memory arranged to store device-executable instructions that, when executed by the processor, cause the computing device: in response to determining that a part of a data item is encrypted, to send a request for a decryption key associated with the part of the data item to a remote computing device; in response to receiving the decryption key associated with the marker and obtaining the encrypted data, to decrypt the encrypted data using the decryption key; and to temporarily output, for a period of an output session, the decrypted data in a position of the encrypted part of the data item.

A third aspect provides a system comprising: a computing device according to the second aspect; and the remote computing device, wherein the remote computing device performs key management operations.

A fourth aspect provides a computer-implemented method comprising: receiving a request from a first client device for a decryption key associated with an encrypted part of a data item; determining whether the first client device is authorized to receive the decryption key; and in response to determining that the first client device is authorized to receive the decryption key, sending the decryption key to the first client device or a second client device associated with the first client device (508), wherein sending the decryption key triggers the first client device or the second client device associated with the first client device to temporarily output, for a period of an output session, the decrypted data in a position of the encrypted part of the data item.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIGS. 2A-2H are schematic diagrams of a number of different example systems in which the methods described herein can be implemented;

Figure 1:
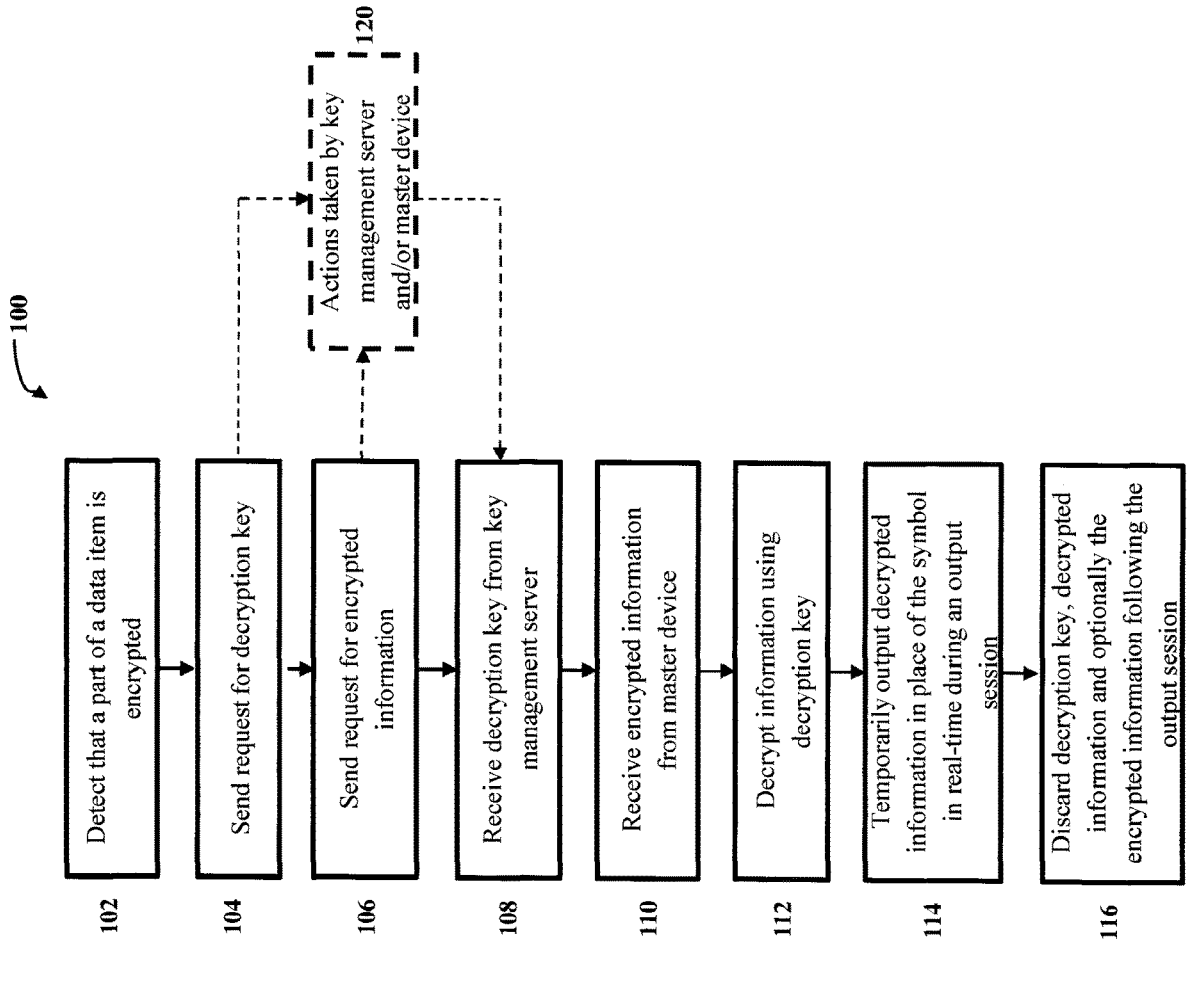
FIG. 1 is a flow diagram of a first example method of providing access to encrypted or hidden data which may be implemented at a client device.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, data security is important in many situations and for many different reasons. The method in which data (i.e. information) is protected varies depending on the form of the information. Documents, audio and video recordings stored online may be protected by requiring a user to login to an online server which requires login credentials. Information printed on physical documents may only be protected by shredding a document once it is not required anymore. However, if the physical document is not shredded, the information is not protected should the document fall into the hands of an unauthorized viewer.

Described herein are a number of different methods of protecting information, i.e. of maintaining data security. The methods described herein are applicable to information that is presented in a variety of formats, including: physical documents, electronic documents, videos, audio recordings etc. and involve the use of symbols or markers to replace a subset (i.e. a part but not all) of the information in a data item (which may alternatively be referred to as a data file), where the subset may be user-defined (e.g. selected by the owner of the information). The symbol or marker may be of any detectable type (e.g. visual, audible, touch-based or any combination thereof) and may be of the same type as the data item (e.g. a visual marker in a visual data item such as a document, image or video, an audible marker in an audio or video file) or of a different type to the data item (e.g. an audible marker embedded in a visual data file). In some examples, the symbol/marker may comprise encrypted data. The information that is replaced by the symbol/marker (where these two terms may be used synonymously) may be sensitive information, such as personal data, or other information that the owner of the information wishes to keep confidential or otherwise control access to. For the purposes of the following description, the information that is replaced by the symbol/marker is referred to as the 'protected information' or 'hidden information' and hence the terms 'protected information' and 'hidden information' refer to the information in unencrypted form.

Using the methods described herein, a client device, in response to determining that part of a data item has been encrypted (e.g. by detecting the symbol/marker), may temporarily reveal the protected information by obtaining a decryption key and an encrypted version of the protected information. In some examples, the decryption key may be requested by the client device from a key management server and an encrypted version of the protected information may be requested from a master device. In other examples, the key and the encrypted information may be requested from the same entity (e.g. from the key management server or the master device, or the key management server and the master device may be the same entity) or only the decryption key may be requested (e.g. where the symbol/marker comprises the encrypted information). By only temporarily revealing the sensitive information and by requiring the decryption means (i.e. the decryption key and/or the encrypted data) to be separately requested for each access, client devices (and hence users of client devices) do not have permanent (or even long-term) access to the protected information. This means that in the event that a user or client device is subsequently deauthorized, they cannot access the protected information again. Furthermore, in some examples, as described below, the encrypted information is only stored on the master device (which may be controlled by the owner of the protected information), thus limiting the number of devices with permanent access (and the number of copies of the encrypted information), which also reduces the risk of unauthorized possession of the protected information.

Figure 2H:
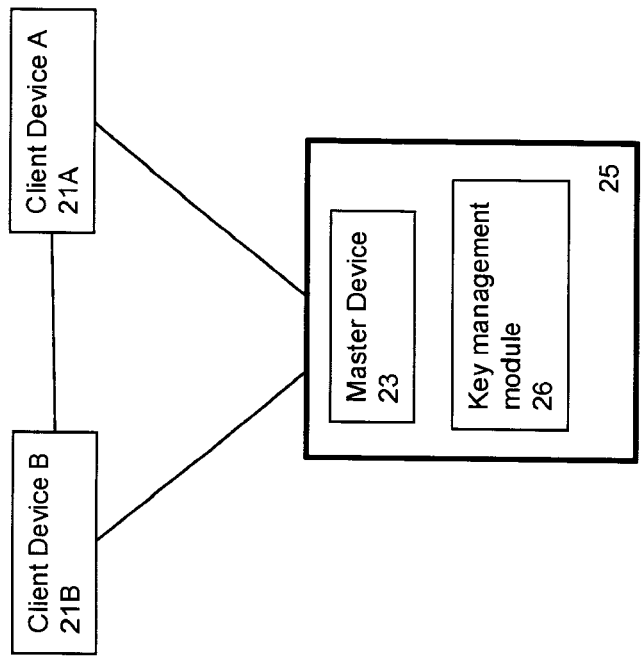
Figure 2G:
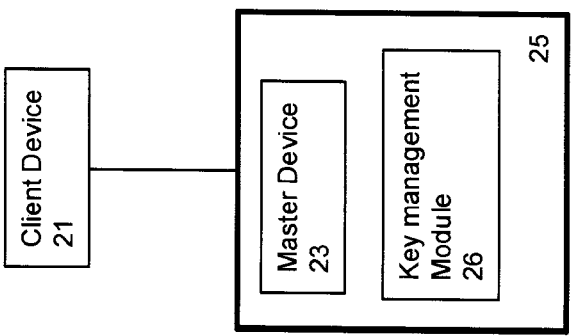

A first example method of providing data security can be described with reference to FIGS. 1, 2A and 2B. FIG. 1 shows a flow diagram of a method 100 performed by a client device with the aim of providing security for information and for authorizing access to said information. FIG. 2A is a schematic diagram of a first example system in which the method of FIG. 1 can be implemented and FIG. 2B is a schematic diagram of a second example system in which the method of FIG. 1 can be implemented. As shown in FIG. 2A, the system comprises a client device 21, key management server 22 and master device 23 interconnected via a network 24 (where this may be a single network or a plurality of interconnected networks). Whilst FIG. 2A shows the key management server 22 and master device 23 as two separate entities, these may be combined such that a single entity (e.g. a single computing device 25) performs both the functions of the key management server 22 and the master device 23, as shown in FIG. 2B, and in such an example, the system may operate in a peer-to-peer mode because there is no central key management server and an individual computing device may perform the functions of either or both a client device (e.g. to access hidden data stored on another master device) and a key management server/master device (e.g. to provide keys and encrypted data to another client device). The single computing device may include a key management module 26 which performs the same functions as the key management server 22, as described in previous examples. In such peer-to-peer modes, the single computing device 25 and the client device 21 may be connected and/or communicate directly without the requirement for a network as shown in FIGS. 2G and 2H. The single computing device 25 and the client device 21 may be connected and/or communicate via, but not limited to, a wired connection, Bluetooth or an IR wireless connection. Furthermore, whilst FIG. 2A shows a single key management server 22, there may be multiple key management servers, e.g. to provide redundancy and/or to distribute the load in responding to requests where there are lots of client devices (e.g. with each key management server being associated with a subset of the master devices).

At block 102 the client device 21 detects that part of a data item has been encrypted. This may comprise detecting a marker (e.g. a visual symbol or other marker, such as an audio or tactile marker) within the data item. The marker represents (e.g. replaces) a piece of protected information which may be present within a data item (e.g. a document, audio file, video file, etc.) along with other pieces of unencrypted information. The marker may comprise an indicator that prompts the client device to recognize that the marker has replaced some information within the data item and hence triggers the client device to perform the subsequent steps in the method of FIG. 1. For example, a native camera application installed on the client device (e.g. a smart phone) may detect the marker as being synonymous with a particular software/product/provider and enable the client device to decrypt the data natively without needing to open an additional application. In another example, the native camera application may detect the marker as being associated with another application installed on the client device and trigger the opening of that application. The marker that is detected (in block 102) may, for example, be an image (e.g. QR code or barcode, a shape or series of shapes), character string (e.g. a random sequence or encrypted or scrambled text), a video, an audio signal, a tactile marker (e.g. a raised pattern or other source of haptic feedback).

At block 104 the client device 21 sends a request for a decryption key and this request may be sent to the key management server 22. The request may include the marker or an identification tag associated with the marker (e.g. where the identification tag may be part of the symbol). In another example, the client device may extract or derive an identification tag from the marker which may be sent to the key management server instead of the marker (e.g. the client device may determine a character string or a URL from a QR code or barcode). In various examples, the marker may comprise data that identifies the key management server 22 or otherwise indicates to the client device where the request should be sent (in block 104). The key management server 22 is shown in more detail in FIG. 4 and is described later. The key management server 22 may be part of a centralized server which provides key management for multiple master devices 23 or may be implemented on the same computing device 25 as the master device 23 (e.g. in a peer-to-peer implementation, as shown in FIG. 2B).

At block 106, the client device 21 requests the encrypted information that corresponds to the marker from the key management server 22. In another example, the client device 21 may make the request directly to the master device 23 (e.g. where the master device also acts as the key management server). In some examples, where the marker is (or includes) the encrypted information, then this request is omitted and this is described below with reference to FIG. 6.

Although FIG. 1 shows the client device 21 sending two requests (in blocks 104 and 106), it will be appreciated that these requests may be combined into a single request (e.g. which is sent to either the key management server 22 or the master device 23 in the system of FIG. 2A or is sent to the combined computing device 25 in the system of FIG. 2B).

Following the requests for the encrypted information and the decryption key made in blocks 104 and 106, actions may be taken at the key management server and/or master device (block 120). These actions may include but not be limited to verifying the client device (or the user of the client device) is authorized to access the encrypted information and the key management server prompting the master device to send the encrypted information to the client device. The key management server and/or master device may also verify the identity of the client device (or user of the client device). Details of the key management server, the master device and the actions taken by the key management and/or master device are described later.

At blocks 108 and 110 the client device 21 receives the decryption key from the key management server 22 and the encrypted information from the master device 23. The key and/or the encrypted information may be received via a secure communication channel and in various examples they may be received via separate secure communication channels. Methods of ensuring the decryption key and the encrypted information are secure whilst being sent across the network 24 include are, but not limited to, a hypertext transfer protocol secure (HTTPS) or a transport layer security (TLS) link.

Once the decryption key and encrypted information have been received, the client device then performs the decryption of the encrypted information using the decryption key at block 112. Following the decryption, the decrypted information is temporarily revealed (e.g. output from the client device) during an output session, wherein the decrypted information is output in place of the symbol/marker in real-time (block 114). The precise manner in which the decrypted information is revealed/output is dependent upon whether the data item is a data item that is viewed by a user (e.g. a document or video clip) and/or heard by the user (e.g. an audio or video clip) and various examples are described below. In an example, where the data item is viewed by a user, an image of the decrypted data is displayed in a window which overlays the data item (or an image of the data item).

Following the termination of the output session, the decryption key, decrypted information and optionally the encrypted information are automatically discarded at block 116. This may, for example, be implemented by only storing the decryption key, decrypted information and encrypted information in memory allocated to the output session (and not in long-term storage). Consequently, when the output session is terminated, the data stored in that allocated memory is automatically deleted or otherwise rendered inaccessible. In another example, client software installed into the client device that implements the method of FIG. 1 may comprise instructions to corrupt (or otherwise destroy or remove) the data pertaining to the decryption key, decrypted information and the encrypted information immediately after the output session is terminated. Discarding the decryption key and decrypted information (and optionally the encrypted information) after each output session means that access to the hidden information is controlled on a per-access basis and ensures that in the event that the authorization for the client device (or the user of the client device) is subsequently removed, the client device does not continue to possess either the hidden information itself or the means to access the hidden information (i.e. the decryption key and the decrypted information are never stored in the client device). Thus, if the client device makes another request to access the encrypted information, the client device will need to request another decryption key.

In an example, the termination of the output session may be triggered when the client device can no longer detect the marker representing the encrypted information. In another example, length of the output session may be predefined by the key management server 22 and/or the master device 23 (e.g. such that the client device may only view the decrypted information for a predefined time, such as maximum of 10 minutes or 1 hour). In another example, the session may be manually terminated by the master device via a network channel (e.g. the master device may transmit a message to the client device which triggers the discarding of the data in block 116). In another example, the output session may be terminated when a window that is showing the decrypted information on a display of the client device is closed.

Whilst FIG. 1 shows the method steps occurring in a particular order, it will be appreciated that they may occur in a different order without affecting the overall operation of the method and/or some of the steps may be performed in parallel. For example, the requests in blocks 104 and 106 may be sent in any order or substantially in parallel and the decryption key and encrypted information may be received in any order or substantially in parallel. Furthermore, although the decryption key is shown as being discarded following the output of the decrypted information (in block 114), the decryption key may alternatively be discarded immediately following the decryption (in block 112) and prior to the output (in block 114).

Figure 3A:
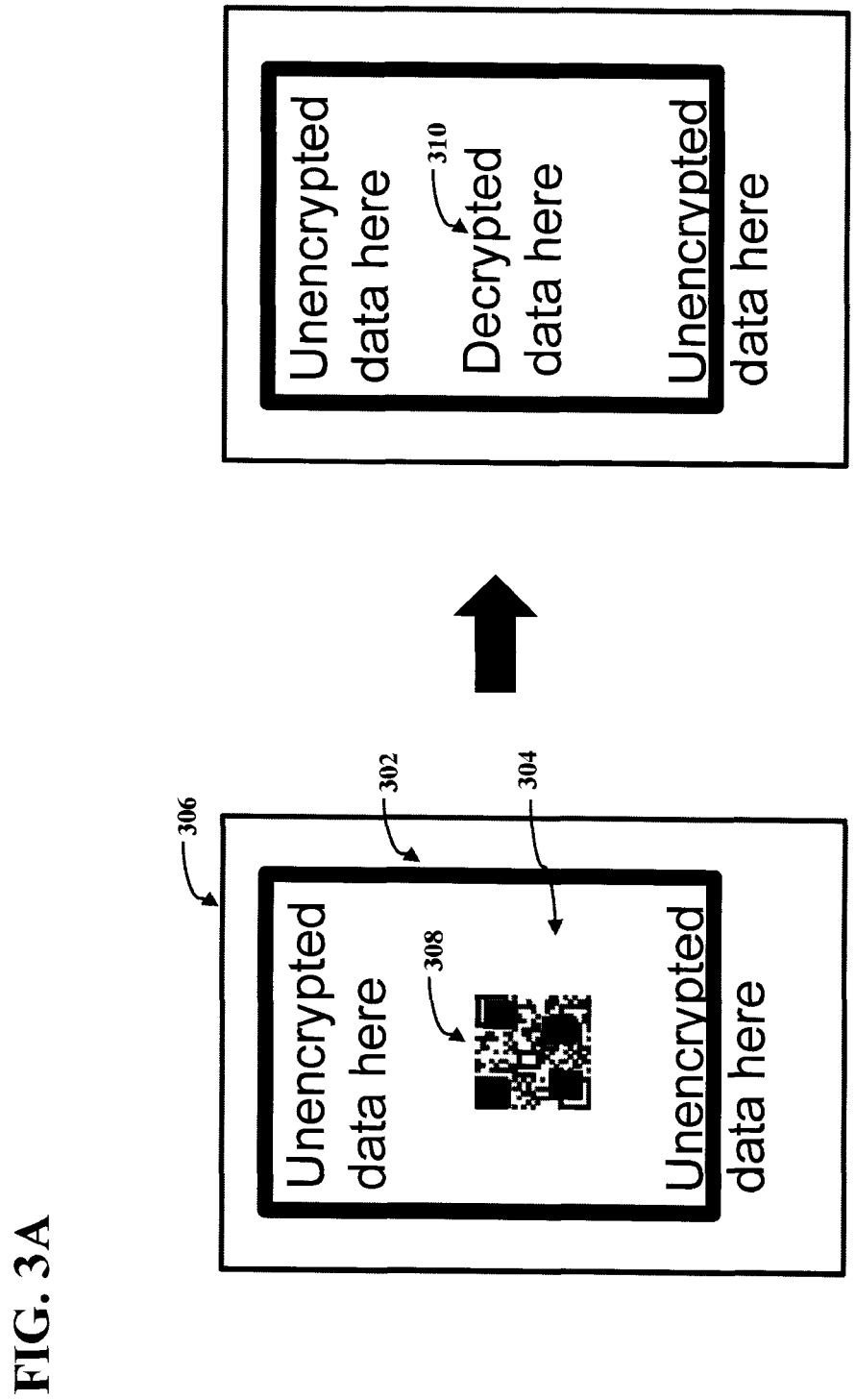
FIGS. 3A and 3B are schematic diagrams showing two different example implementations of the method of FIG. 1.

In an example implementation, as shown in FIG. 3A, a smart phone 302 (or any other computing device with a display and a camera, which may be integral to the computing device or external devices connected to the computing device) may capture and display a live video 304 of a document 306 (e.g. a printed document or a document displayed on a computing device) containing a symbol 308 that has replaced some information. Using augmented reality (AR) technology (and the method of FIG. 1), the client device (e.g. the smart phone) may obtain the decrypted information corresponding to the symbol 308 and overlay it 310 where the symbol 308 is located on the document (e.g. such that the smart phone presents an image of the document showing what it would look like if the information had not been replaced by the symbol). The decrypted information corresponding to the symbol 308 may be displayed as an image in an AR window on the client device. The decrypted hidden information 310 is only displayed (and hence visible to a user) whilst the symbol 308 can be detected in the image captured by the camera. Consequently, if the camera pans away from the document (such that the symbol 308 is no longer in the field of view) and then pans back to the document, the symbol is displayed rather than the decrypted hidden information and the method of FIG. 1 may be triggered again.

As shown by the example of FIG. 3A, by using the method of FIG. 1, the security of the hidden information within the document is maintained even when the document is printed out as a physical document. Furthermore, if a user were to have their access to the information on the physical document revoked but still be in possession of the physical document, they would not have the means to access it. Although methods of destroying physical documents are largely successful, occasionally they can be restored to expose the content of the document (e.g. a shredded document may be reconstructed) whereas by using the method of FIG. 1, the information is never present on the physical document and hence it is impossible to gain unauthorized access to the information.

In another example implementation, the client device (which may also be a smart phone or other computing device) may detect or access an audio clip containing information that may be encrypted in such a way that the encrypted part of original recording is not audible to a user or otherwise replaced by an audible marker whilst the unencrypted part of the original recording is still audible to the user. The client device may use the method of FIG. 1 to obtain a decryption key and the encrypted version of the hidden (audio) data based on detection of the audible marker. The client device may then decrypt the audio file and play the decrypted information through a speaker so that it is audible over (or otherwise replaces) the audio marker within the audio file. In another example, the marker that is inserted into the audio clip may be inaudible to a user (e.g. using a frequency range the human ear cannot detect), however when the encrypted audio clip is decrypted, the client device may output the decrypted version that is audible for the user.

In another example, the client device may detect a video clip containing a marker and for a video clip, the hidden data may be visual data and/or audio data and hence may be displayed/played temporarily in place of the marker using either or both of the methods described above (e.g. in relation to a physical document or an audio clip).

Figure 3B:
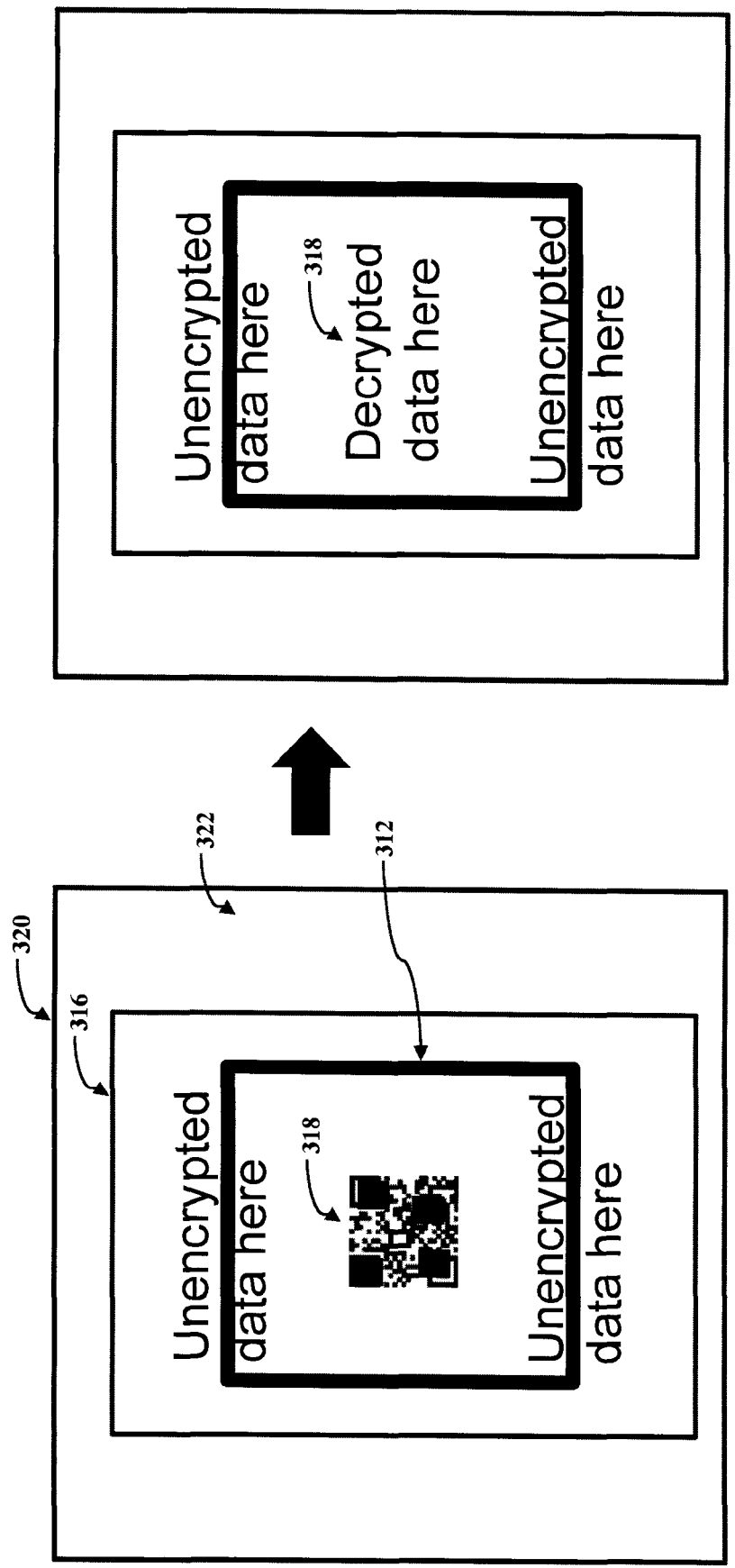

In another example as shown in FIG. 3B, the document 316 containing the marker 318 may not be printed out but opened on a computing device and displayed on a display 320. For example, the document may be opened in an application (e.g. a document editing application such as Microsoft Word, Google Docs or Adobe Acrobat). In such an example, a virtual window 312 may be provided in a desktop user interface 322 which, when dragged over the document (by a user) such that the area it covers includes the marker 318 displayed on the screen, triggers the computing device to perform the method of FIG. 1 and display the decrypted information 330 in place of the marker. The virtual window 312 may be incorporated into the application (e.g. the document editing application), may be provided by an application that is separate to the application displaying the document or may be part of the operating system. Providing a virtual window 312, so that the hidden information is overlaid on top of, but separately from, the document provides additional security because it prevents the decrypted content from being saved in the document. As with a printed document, if the virtual window is moved away so that it no longer encompasses the marker 318, the output session ends and the hidden information is not visible until the method of FIG. 1 has been triggered again.

The term 'document' is used herein to refer to any human-readable data item irrespective of whether it comprises text or figures and irrespective of its format (e.g. it may be a word-processed document, a spreadsheet, a presentation file, etc.).

Authorization of a first client device (client device A, 21A) may be provided with the implementation of 2-factor authorization. Upon requesting a decryption key and/or encrypted information, the client device may receive a prompt from the key management server and/or master device requesting 2-factor authorization. In this example, a second client device (client device B, 21B) associated with the first client device, may receive a prompt from the key management server and/or master device notifying the second client device that the first client device is requesting a decryption key. The user, operating both of the client devices, may confirm that they are also operating the second client device resulting in a prompt being sent from the second client device to the key management server and/or master confirming the identity of the user. The second client device may have already been authorized previously by the key management server and/or the master device. By implementing 2-factor authorization in the authorization process for the client device, the security of the encrypted information is increased. Further examples which use more than one client device operated by the same user are described below with reference to FIGS. 7A-7D.

In some examples, following the detection of a marker by a client device, authorization of the client device may be granted based on the geographical location of the client device when it requests authorization and hence this may determine whether the client device receives the decryption key (in block 108) in response to sending the request (in block 104). The geographical location of the client device may be determined, but not limited to, using a GPS within the client device or by detecting that the client device is connected to a local network that may be authorized (e.g. connected to a wi-fi network or a Bluetooth network). In another example, following the detection of the marker by the client device, the time at which the client device requests authorization may determine whether authorization is granted to the client device and hence this may determine whether the client device receives the decryption key (in block 108) in response to sending the request (in block 104). For example, the client device may only be able to access the encrypted information during working hours or during weekdays (i.e. 9 am-5 pm, Monday-Friday). The time dependent authorization may be combined with the location dependent authorization. For example, a client device may only be authorized if it is connected to a wi-fi network provided by a company that utilizes the client device and that it is between 9 am and 5 pm on a weekday.

The encrypted information, that is received by the client device in block 110, may also be coded with a safeguard preventing a user, who may be operating the client device, or the client device itself from recording or capturing the output decrypted information. For example, there may be code that prevents the use of a screenshot feature on an electronic device. Additionally, watermarks unique to individual client devices may be included over the outputted decrypted information so that in the event that a user takes a photograph of the client device displaying some encrypted information using an external device, the watermark can be used to trace which client device the photograph was taken from.

Figure 4:
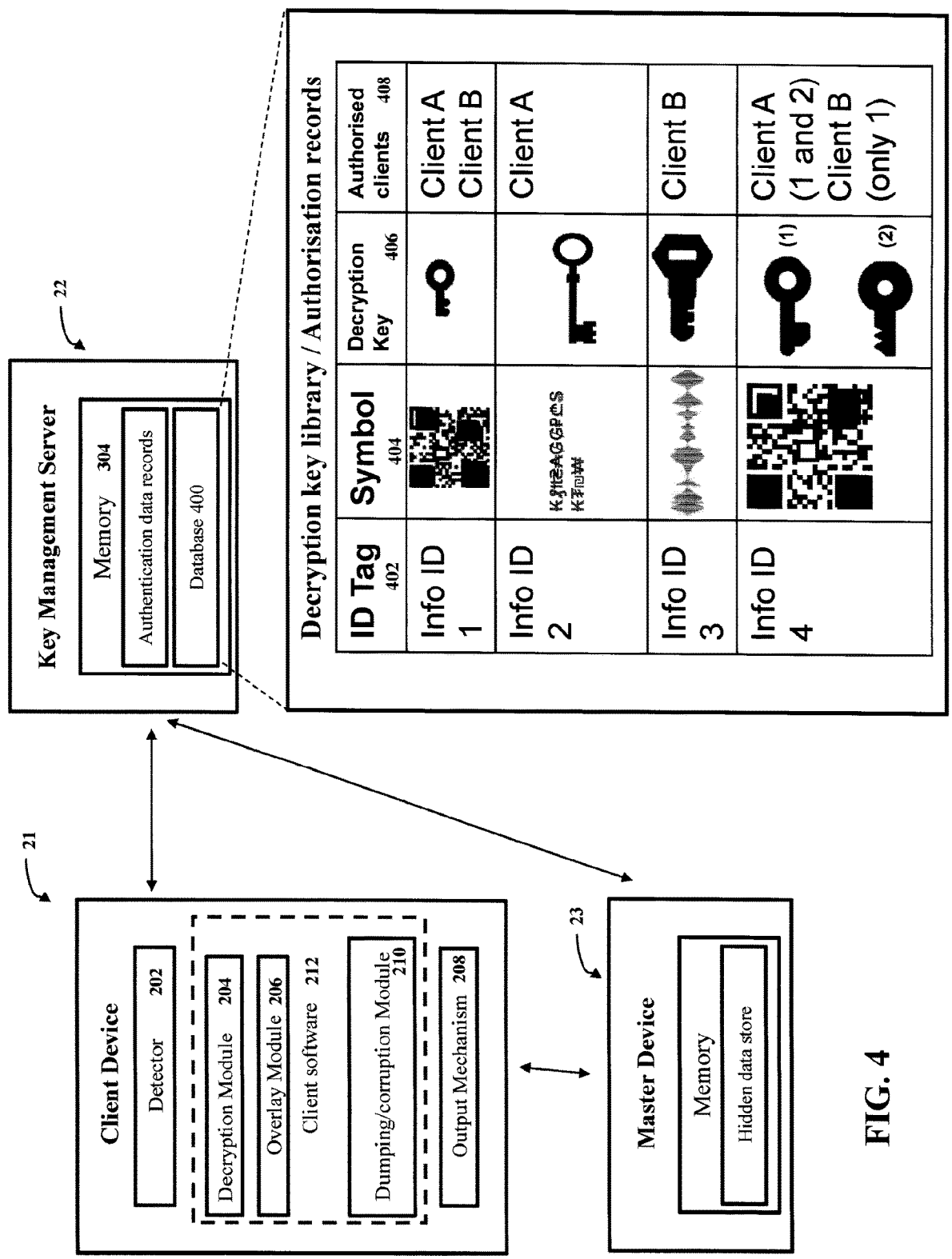
FIG. 4 shows elements of the systems of FIGS. 2A-2H in more detail.

FIG. 4 schematically shows a non-limiting example of a client device 21 that may be configured to implement the method of FIG. 1 (e.g. it may have software stored on the device that, when executed, causes the client device to perform the method of FIG. 1). The client device 21 may, for example, be a portable computing device (e.g. mobile phone, tablet, laptop, virtual reality headset, augmented reality headset, head mounted display) or a personal computer. The client device 21 may include one or more detectors 202. The detectors may comprise a visual detector (e.g. camera, IR scanner etc.) and/or an audio detector (e.g. microphone) and may be configured to detect (or capable of detecting) a symbol representing a piece of encrypted information (e.g. in block 102). The one or more detectors 202 may be implemented in hardware and/or software. The client device 21 may include a decryption module 204 configured to use the decryption key to decrypt the encrypted information (e.g. in block 112). The client device may include an overlay module 206 configured to combine the unencrypted portions of the original data (e.g. the original document or audio file) and the decrypted information in place of symbol representing the information. The client device may include an output mechanism 208 which may be an electronic display, a speaker, a source of haptic feedback etc. and may output the combination generated by the overlay module 206 (e.g. in block 114). The client device may also include a data dumping/corruption module 210 configured to implement the data corruption instructions. In various examples, one or more of the decryption module 204, overlay module 106 and dumping module 210 may form part of a software application 212 that is configured to implement the method of FIG. 1.

As also shown in FIG. 4, the key management server 22 may include memory 304 to store a database 400 comprising records relating to a plurality of pieces of hidden information. Each record in the database 400 may include a plurality of data items for each piece of hidden information, such as: an identification tag 402 and/or the symbol/marker 404 used to represent the piece of hidden information, the relevant decryption key to gain access to the piece of hidden information 406, and a list of authorized client devices or users permitted to access the piece of information 408. The records stored in the key management server may be accessible and updatable from the master device 23. In this example at least, the key management server 22 does not store the encrypted information and this is instead stored at the master device 23. This is to reduce the number of locations in which the encrypted information exists thus reducing the likelihood of it being possessed, or accessed, by an unauthorized user or client device. In addition to storing the records about the pieces of hidden information, the memory 304 in the key management server 22 may also store authorization (or authentication) records that may be used to authenticate client devices and/or users of client devices in response to receiving a request for a decryption key (e.g. as sent in block 104) or alternatively, the key management server 22 may communicate with a separate authentication server (not shown in FIGS. 2A-2H and 4) to confirm the identity of any requesting device or user. In various examples, the database 400 may utilize blockchain technology.

FIG. 4 also shows an example of a master device 23. As described above the master device comprises a memory 418 arranged to store the encrypted hidden data 420. Whilst FIGS. 2A-2H and 4 show only a single master device 23, there may be multiple master devices, each arranged to store different elements of encrypted hidden data, with the access to keys controlled by a central key management server 22. Alternatively, there may be multiple key management servers 22 (e.g. one per master device).

Figure 5:
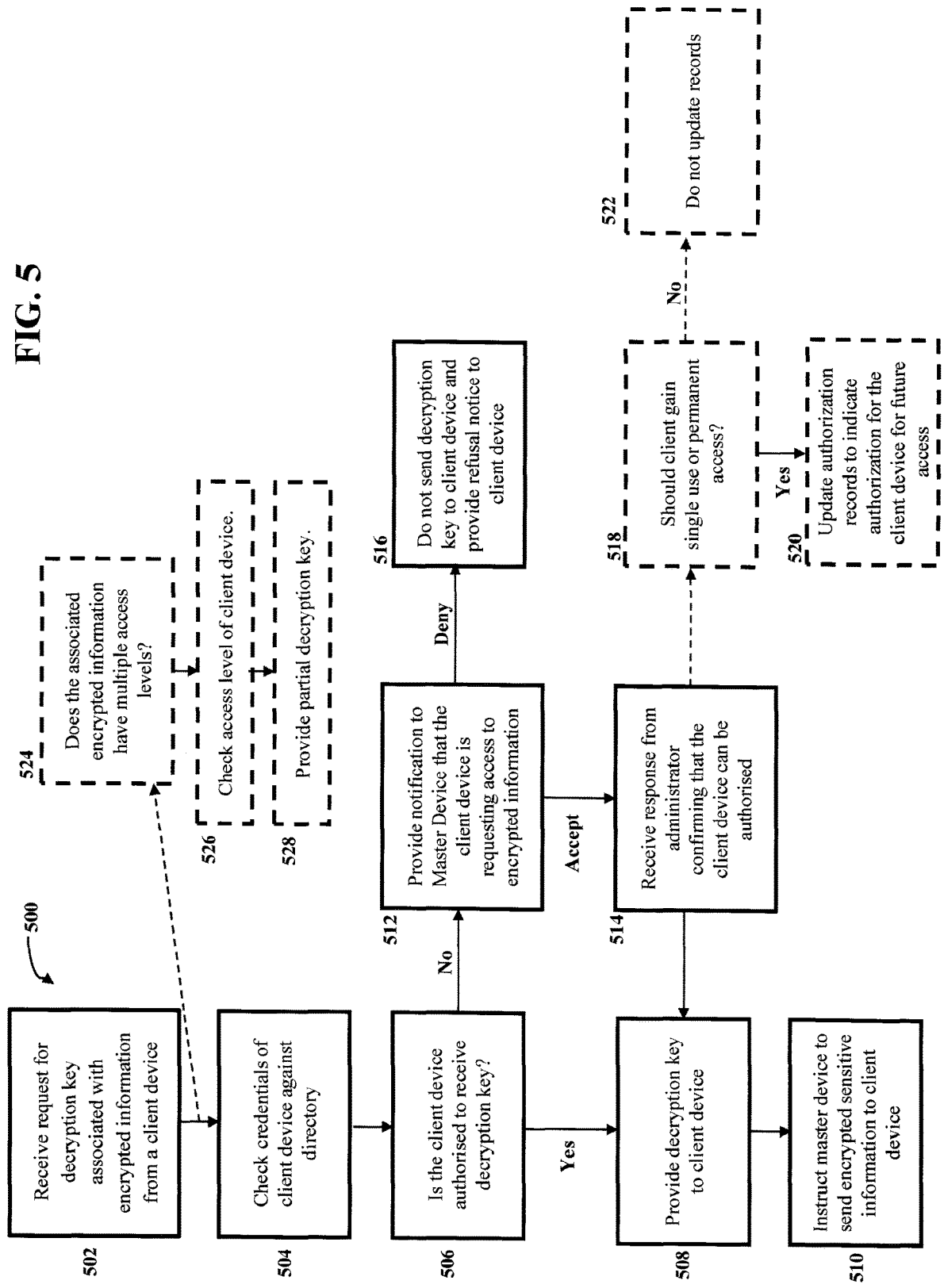
FIG. 5 is a flow diagram of an example method of operation of a key management server, such as the key management server shown in in FIGS. 2A-2H and 4.

FIG. 5 shows a flowchart 500 of an example method of operation of the key management server 23 in response to a request to access a piece of hidden information received from a client device (e.g. a client device that is implementing the method of FIG. 1). At block 502 a request is received from a client device to access a piece of hidden information. The request may include the symbol representing the hidden information and/or the identification tag for the hidden information. The request may also identify the requesting client device or user of the client device, for example in the form of an identifier synonymous with the client device (e.g. serial code, user login details, phone number, e-mail address registered to the client device etc.).

The key management server then crosschecks the credentials of the client device or user with the stored records at blocks 504 and 506 to confirm that client device or the user of the client device has authorization to access the information associated with the received symbol or identification tag. If the client device is authorized, the key management server sends the decryption key to the client device at block 508 and instructs the master device to send the encrypted information to the client device at block 510. As described above, in some examples, the authorization may in addition be dependent upon the time and/or location of the client device and this may also be checked in block 506.

If the key management server, upon consulting the database, identifies that the client device does not have access to the information associated with the received symbol or identification tag, the key management server may notify the master device at block 512 that a client device is requesting access to the information. The key management server may send the identity if the user and/or credentials pertaining to the client device to the master device so that the master device or the user of the master device may easily identify who is requesting access. This may help the master device or the user of the master device to decide as to whether authorization should be granted to the client device and/or the user.

The key management server may receive a "deny" response at block 516 from the master device. In this event, the key management server will not send the decryption key to the client device, but instead may send a refusal notice. If instead the key management server receives an "accept" response from the master device at block 514, the key management server proceeds to blocks 508 and 510 (as described above).

The key management server may also receive instructions from the master device at block 518 as to whether the client device should be provided with permanent access or single use access. The term 'access' in the context of FIG. 5 refers to whether the client device is authorized to access the encrypted information and hence is authorized to receive an encryption key (i.e. 'Yes' or 'No' in block 506). The access period may also be defined over a length of time (e.g. access granted for 24 hours). If the master device sends instructions that the client device should be granted permanent access, the key management server updates the database at block 520 so that the client device credentials are recorded as authorized with the relevant identification tag for the information (e.g. within the relevant record in the database 400). If the master device issues instructions that the client device should only be given single use access, the key management server proceeds to 522 and does not update the database.

As an additional feature, the master device 23 may manually instruct the key management server to remove or grant authorization for a piece of information to a user or client device without being prompted by the key management server 22. As the method of FIG. 1 requires that the decryption key and encrypted data is obtained independently for each output session, this means that if access to a piece of information is removed between a first output session and a subsequent attempt to obtain the hidden information, the subsequent attempt will fail (as a consequence of access being denied following block 506 or block 512). For increased security, once a device/user has their authorization removed by the master device 23, the hidden data may be encrypted with a new key (with the encrypted version of the hidden data with the original key being deleted) and a corresponding new decryption key provided to the key management server 22 (i.e. the stored decryption key is replaced by a new decryption key). It will be appreciated that the key used to encrypt the data (the encryption key) may be different from the key provided to client devices to decrypt the data (the decryption key).

In the method of FIG. 5, the client device 21 only sends requests to the key management server 22 (in blocks 104 and 106, although as described above, these requests may be combined into a single request) and does not need to know the identity of the master device 23. In a variation of the methods shown in FIGS. 1 and 5, the client device 21 may send two requests: one to the key management server 22 for the decryption key (in block 104) and one to the master device 23 for the encrypted data (in block 106). In such an example, both the master device 23 and the key management server 22 may authenticate the client device or user prior to responding to the request. The client device 21 may determine the identity of the master device 23 based on the symbol/marker or this may be communicated to the client device 21 by the key management server 22 (e.g. along with the decryption key). For example, a digital certificate may be included as part of the symbol/marker or in the vicinity of the symbol/marker. In yet another variation, the client device may only send requests to the master device 23 and the master device 23 may instruct the key management server 22 to send the decryption key to the client device and in such an example, authentication may be performed only by the master device 23.

As an optional feature, a symbol may represent hidden information with multiple levels of access, such that dependent upon the access level granted, different parts of the hidden information may be revealed using the methods described herein. For example, a first client device may only have authorization to see half of the hidden information whereas a second client device may have authorization to see all of the hidden information. In this event, at block 524, the key management server may consult the stored decryption key library (e.g. database 400) to determine whether the information has been encrypted with multiple levels of authorization, check the credentials of the first client device at block 526, and, in the event that the first client device only has partial access, a partial access decryption key may be issued to the client device at block 528, wherein the partial decryption key will only be able to decrypt a portion of the information represented by the symbol/marker. In this example, there are two (or more) different decryption keys for a single piece of encrypted information: one partial decryption key providing partial access to the information (or more than one partial decryption keys, where there are more than two access levels) and a full decryption key providing access to all of the encrypted information. A partial decryption key may be derivable from the full decryption key such that a client device provided with the full decryption key can generate all the partial decryption keys and decrypt the entirety of the encrypted data.

Alternatively, individual keys may be assigned to different parts of the information represented by the symbol (i.e. a first key for a first half of a piece of information, and a second key for the second half of the information) which is illustrated in FIG. 4 as part of the decryption key library. The row for "Info ID 4" shows two different decryption keys being associated with a symbol (in this case a QR code), where client A (where this may be a client device or a user of a client device) is authorized to receive both keys (keys 1 and 2) and client B is only authorized to receive key 1. In these examples, the master device the entirety of the encrypted data to the client device or may only send the parts of the encrypted information that the user or client device has authorization to access so as to avoid unnecessarily sending encrypted information which might reduce the security of the encrypted information.

In another example, multiple pieces of information on the same document may be represented by different symbols, wherein each of the symbols may be assigned a different decryption key and each of the symbols may have different authentication requirements in order to obtain the decryption key for the particular symbol. For example, a first piece of information in a document may be replaced by a first symbol and a second piece of information in the same document may be replaced with a second symbol, with the first and second symbols being assigned different decryption keys. In this scenario, a first client device may have authorization for the first piece of information and a second client device may have authorization for the second piece of information, wherein the first and second pieces of information are positioned in different locations in the document. There may be a third client device that has authorization for both the first and second pieces of information. The use of different encryption keys for different parts of the same document provides a finer granularity of access control to sensitive information and provides enhanced security because even if one piece of the document is leaked (e.g., as a consequence of a successful hacking attempt or other security breach), the remaining pieces of the document which are replaced by different symbols with different keys and/or authentication requirements remain secure.

In another example, there may be only one decryption key that is applicable to an entire piece of information represented by a symbol, however the multiple levels of access may be implemented by what the master device sends to the client device. For example, a client device may receive a decryption key from the key management server, but only receive the first half of the encrypted information from the master device due to the limited access rights of the client device or user.

As an additional optional feature, the encrypted information may be in a form such that users of the client devices may edit the encrypted information. The master device may provide an indication to the key management server that a user or a client device has permission to edit the information represented by the marker. For example, a read/write indicator may exist for each marker whereby the key management server records which users and/or client devices may edit or just view/listen to the information associated with the marker. In this example, once the user of the client device has finished editing the information, the master device may receive an update from the client device with details of the changes made to the information and update the information stored at the master device. In the same way as described previously with regards to the termination of the output session, once the user at the client device has finished editing the information, the output session is terminated and the decrypted information, along with the edits made to the information, is automatically discarded. Therefore, the information is still only stored at the master device, thus reducing the risk of the information being stored or in the possession of an unauthorized client device or user.

Figure 6:
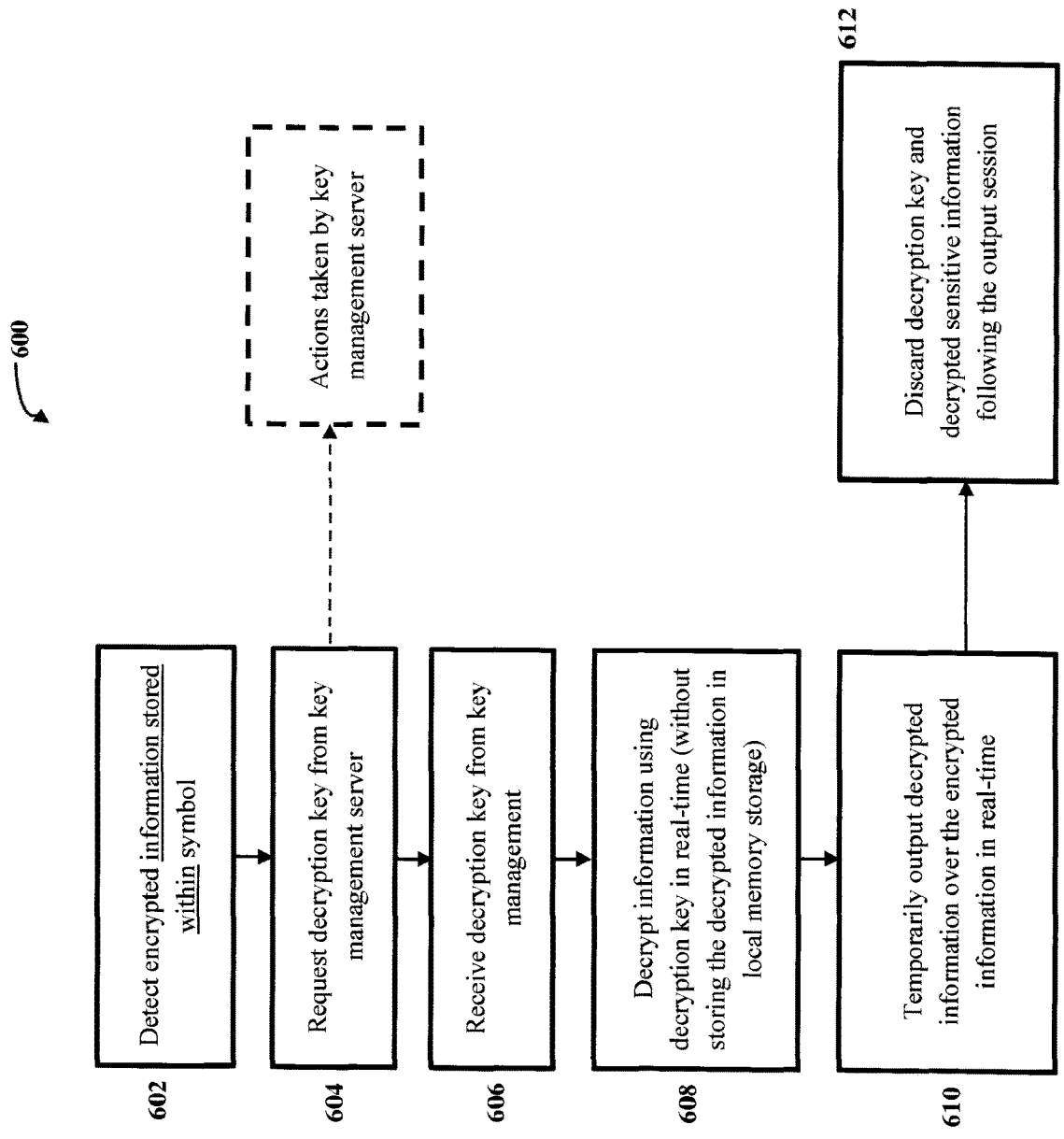
FIG. 6 is a flow diagram of a second example method of providing access to encrypted or hidden data which is a variation on that shown in FIG. 1.

The flow diagram in FIG. 6 shows a variation of the method 100 in which information may be encrypted and temporarily accessed by a client device. In this example, the encrypted information is stored within the symbol/marker representing the information (e.g. a QR code) or the symbol/marker may comprise the encrypted data itself (e.g. in the form of a string of characters). In examples where the encrypted information is stored within the symbol/marker, there may not be a master device 23, e.g. as shown in FIG. 2C. Alternatively, the system may comprise a master device 23 (e.g. as shown in FIG. 2A or B) but once the master device 23 has generated the data item including the symbol marker it may play no further part in controlling access. In yet further examples, whilst the master device 23 does not provide the encrypted information to a client device (as in the examples described above), it may still be involved in controlling access to the decryption keys (e.g. as described above with reference to FIG. 5 with block 510 omitted).

The client device detects the symbol at block 602 and sends a request including the symbol or an identification tag associated with the symbol to the key management server to request access to the associated information at block 604 (in the same way as in block 104). Actions then may be taken by the key management server analogous to those taken in FIG. 5 (although, as described above, the key management server does not need to instruct the master device to send the encrypted data to the client device, so block 510 is omitted).

In this example, the client device only receives an decryption key from the key management server at block 606, allowing the client device to decrypt the encrypted information in real-time at block 608 directly from the data stored within the detected symbol. Once the encrypted information has been successfully decrypted, the client device temporarily outputs the decrypted information over (or in place of) the encrypted information in real-time at block 610 (e.g. as described above in relation to block 114). In the same manner as described in method 100, the decrypted information and decryption key are discarded at block 612 following the end of the output session (e.g. as in block 116, described above), so that the decryption key and decrypted data are never stored within the client device.

Where the symbol includes, or is, the encrypted information, to reduce the number of locations in which the information stored within the symbol is stored, it may be beneficial to send an identification tag associated with the symbol instead of the symbol itself to the key management server thus preventing the encrypted information itself being sent across a network. This will prevent the risk of the information being intercepted by an authorized device or user as it is sent to the key management server. As described above, the identification tag for a symbol may be stored within the symbol or may be derivable from the symbol.

In the examples described above, there is a single client device 21 which performs the steps of the method shown in FIG. 1 or FIG. 6. In other examples, however, these steps may be performed by a combination of two (or more) client devices that are being used concurrently by the same user. FIGS. 2D-2F and 2H show schematic diagrams of example systems where there are two client devices, client device A 21A and client device B 21B which are being used concurrently by a single user and these systems shown in FIGS. 2D, 2E, 2F and 2H operate in a similar manner to the systems shown in FIGS. 2A, 2B, 2C and 2G respectively. The first client device, client device A, may, for example, be a smart phone that is connected to a computer (client device B) via a network connection or a direct connection (e.g. via a wire or using a wireless protocol, such as Bluetooth). In the peer-to-peer implementation, the computing devices 21A, 21B, 25 may communicate via a network 24 as shown in FIG. 2E or directly as shown in FIG. 2H.

Figure 7A:
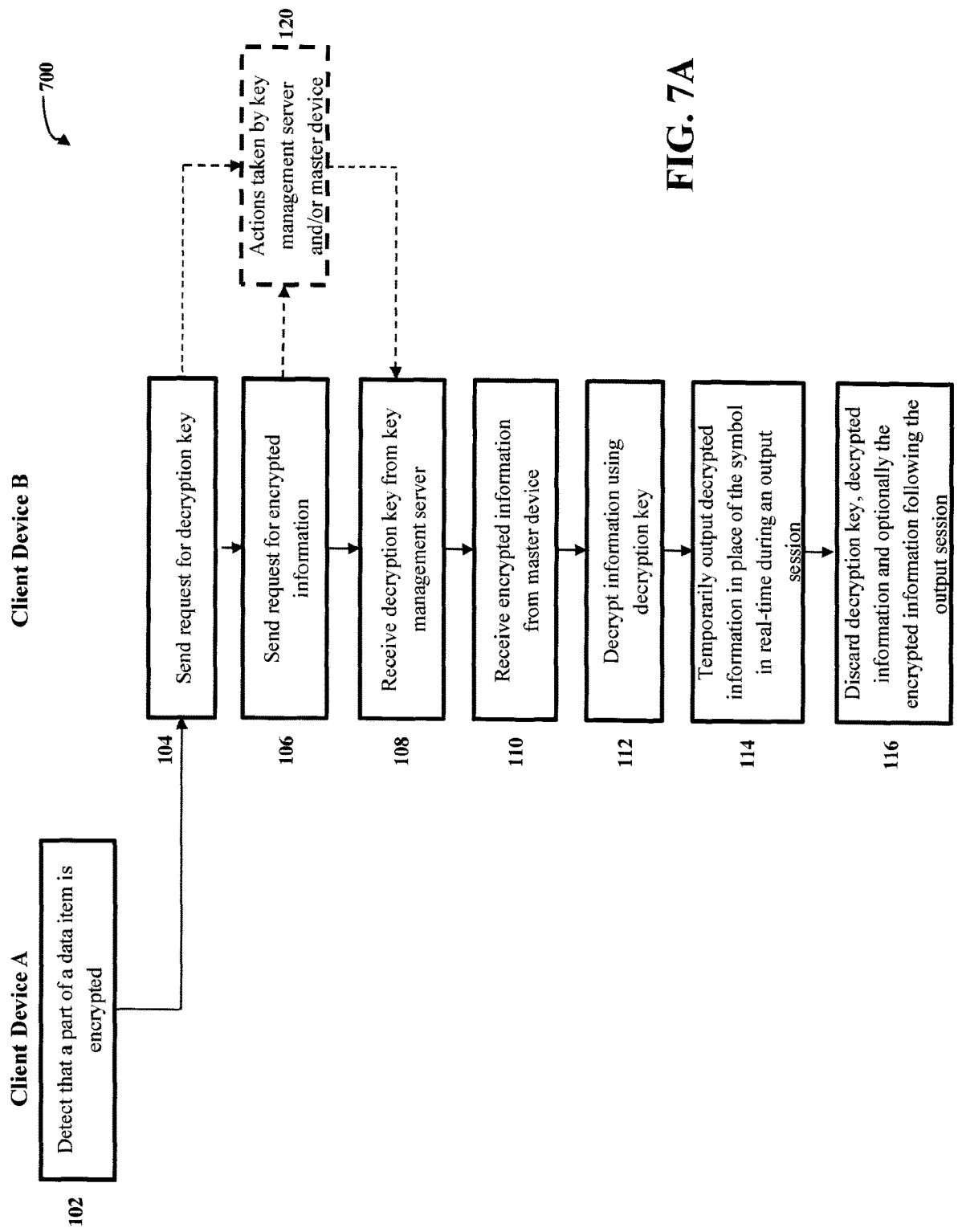
FIGS. 7A-7D are flow diagrams of further example methods of providing access to encrypted or hidden data which are a variation on those shown in FIGS. 1 and 6.
Figure 7B:
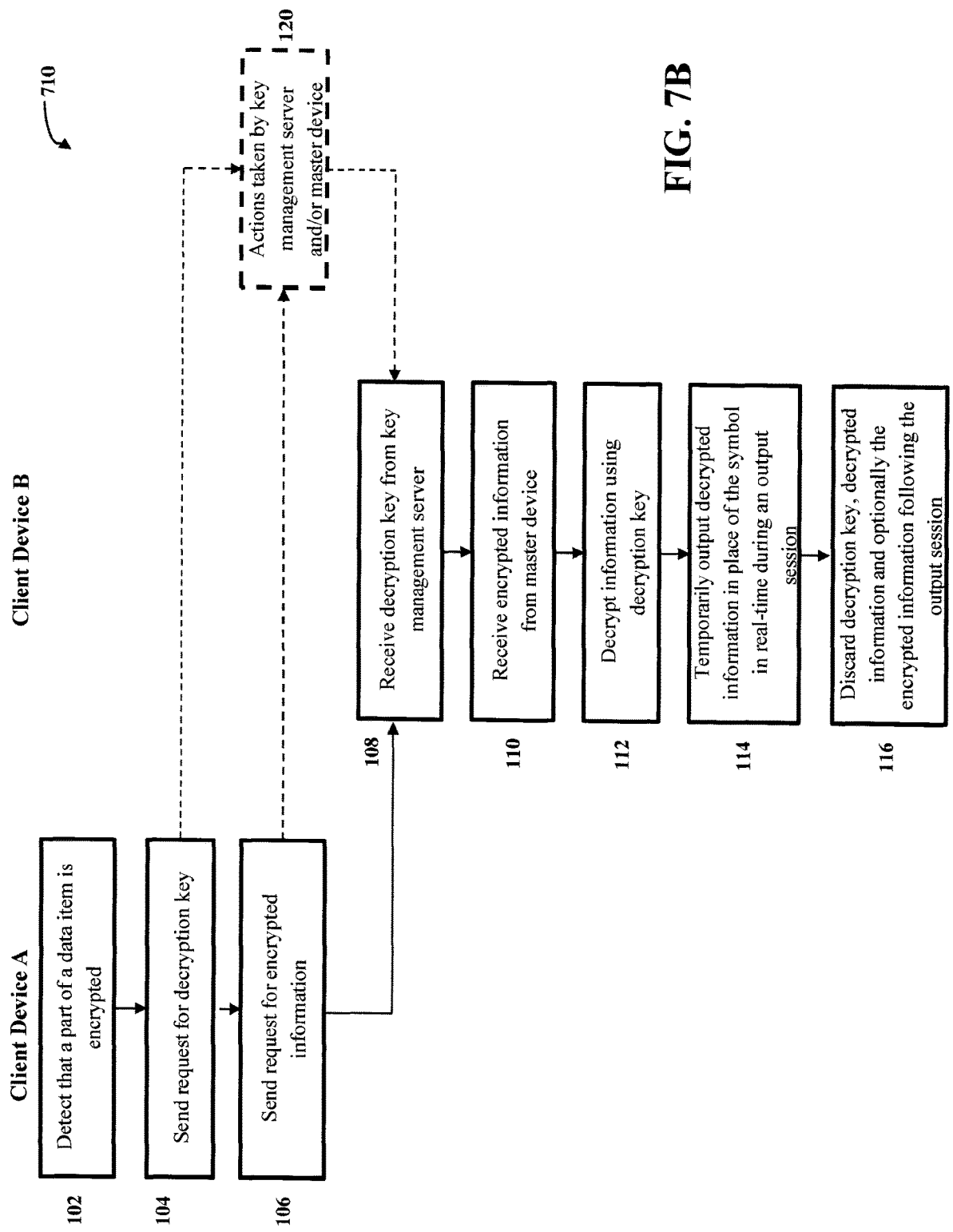
Figure 7C:
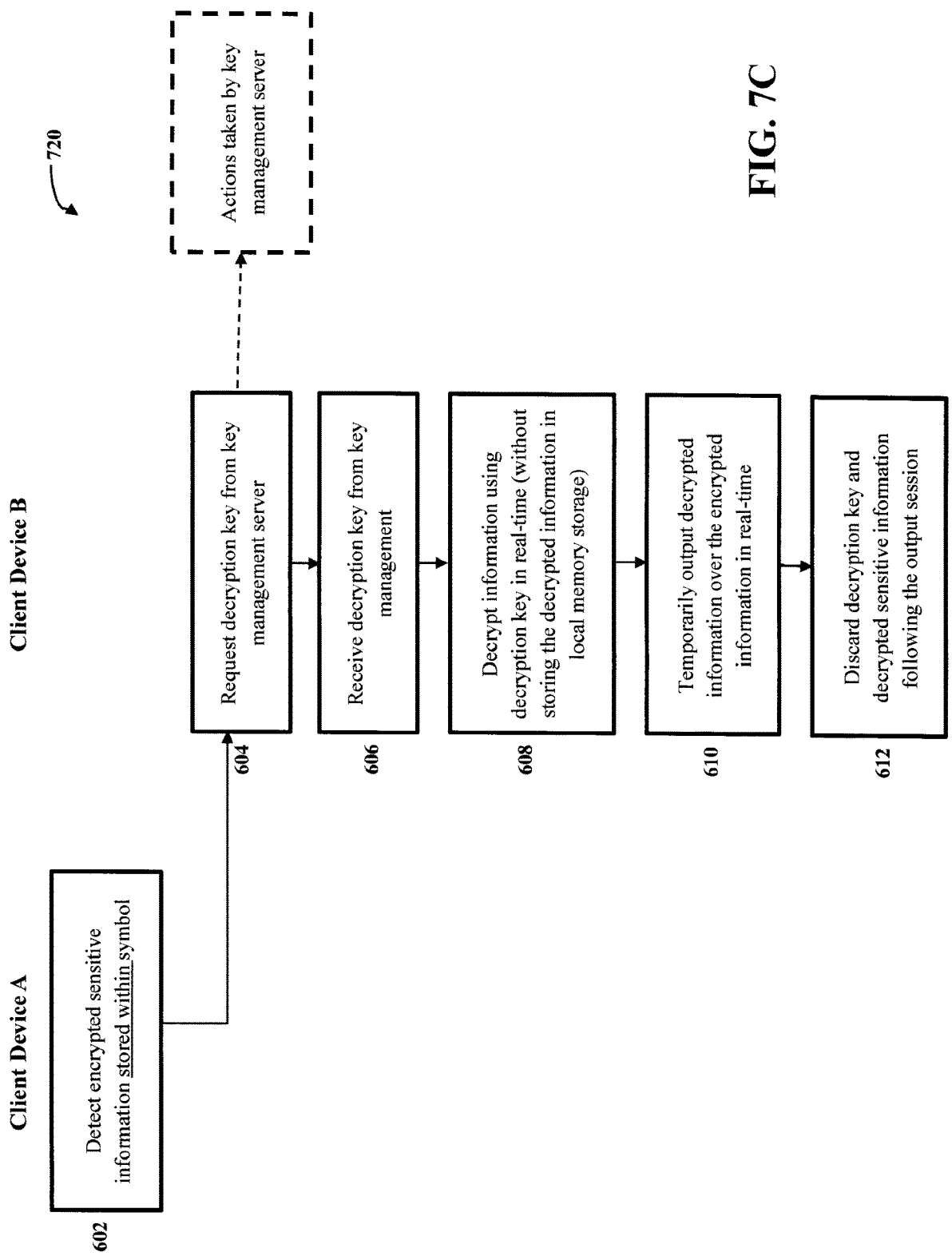
Figure 7D:
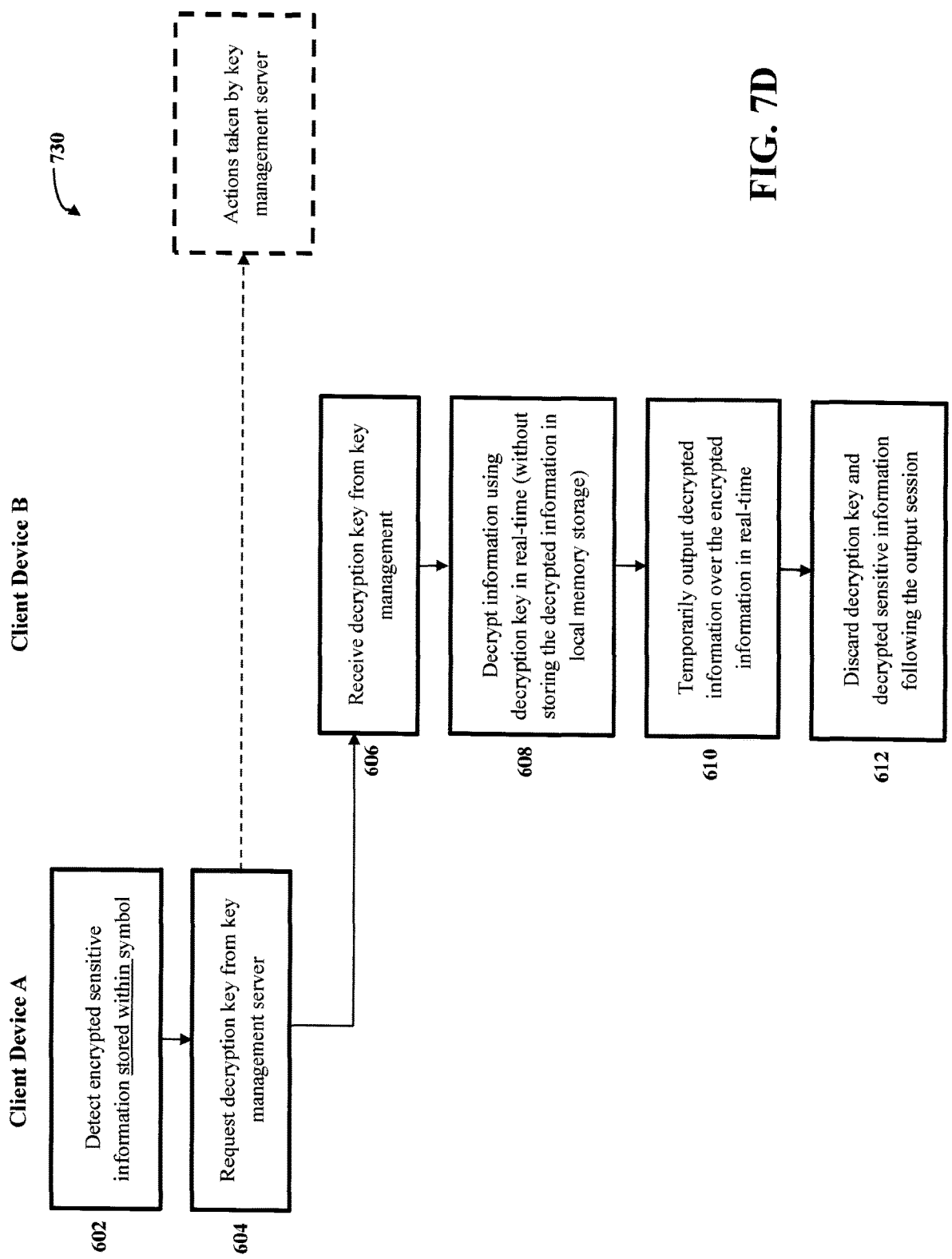

The flow diagrams in FIGS. 7A and 7B show further variations of the method 100 in which information may be encrypted and temporarily accessed by a client device. In both of these methods, two client devices are involved and so the methods may be implemented in the systems shown in FIG. 2D or 2E. The flow diagrams in FIGS. 7C and 7D show further variations of the method 600 in which information may be encrypted and temporarily accessed by a client device. In both of these methods, two client devices are involved and so the methods may be implemented in the systems shown in FIGS. 2D-2F and 2H (e.g. dependent upon whether the master device 23 plays an active role in the provision of the decryption key and/or encrypted data). The method may be used in implementations where the decryption key is not discarded/corrupted at the end of the output session. An example of such an implantation is described later in reference to FIG. 9.

As shown in FIGS. 7A-7D, client device A 21A (e.g. a camera incorporated in the smart phone) may detect the symbol representing the encrypted information (in block 102 or 602) and this may trigger the associated client device, client device B, to perform the rest of the method of FIG. 1 or FIG. 6, as shown in FIGS. 7A and 7C, including performing the decryption and temporarily outputting the decrypted information in an output session.

In other examples, as shown in FIGS. 7B and 7D, the first client device, client device A, may perform additional steps from the method of FIG. 1 or FIG. 6, such as sending the requests for the decryption key. In further examples, not shown in the FIGS., the second client device, client device B, may provide the decrypted information to first client device, such that the first client device performs the step of temporarily outputting the decrypted data (e.g. in block 114 or block 610). In such examples, the discarding of the decrypted information (in block 116 or block 612) may be performed by both the client devices.

The multi-device configuration, as shown in FIGS. 2D-2F and 2H and 7A-7D may serve the additional purpose of providing a means of implementing 2-factor authorization to increase the security of the encrypted information. In the examples described above, the first client device and the second client device may have separate authorization credentials which will both need to be provided to the key management server and/or master device (and checked in block 504 of FIG. 5) in order to access the encrypted information.

Figure 8A:
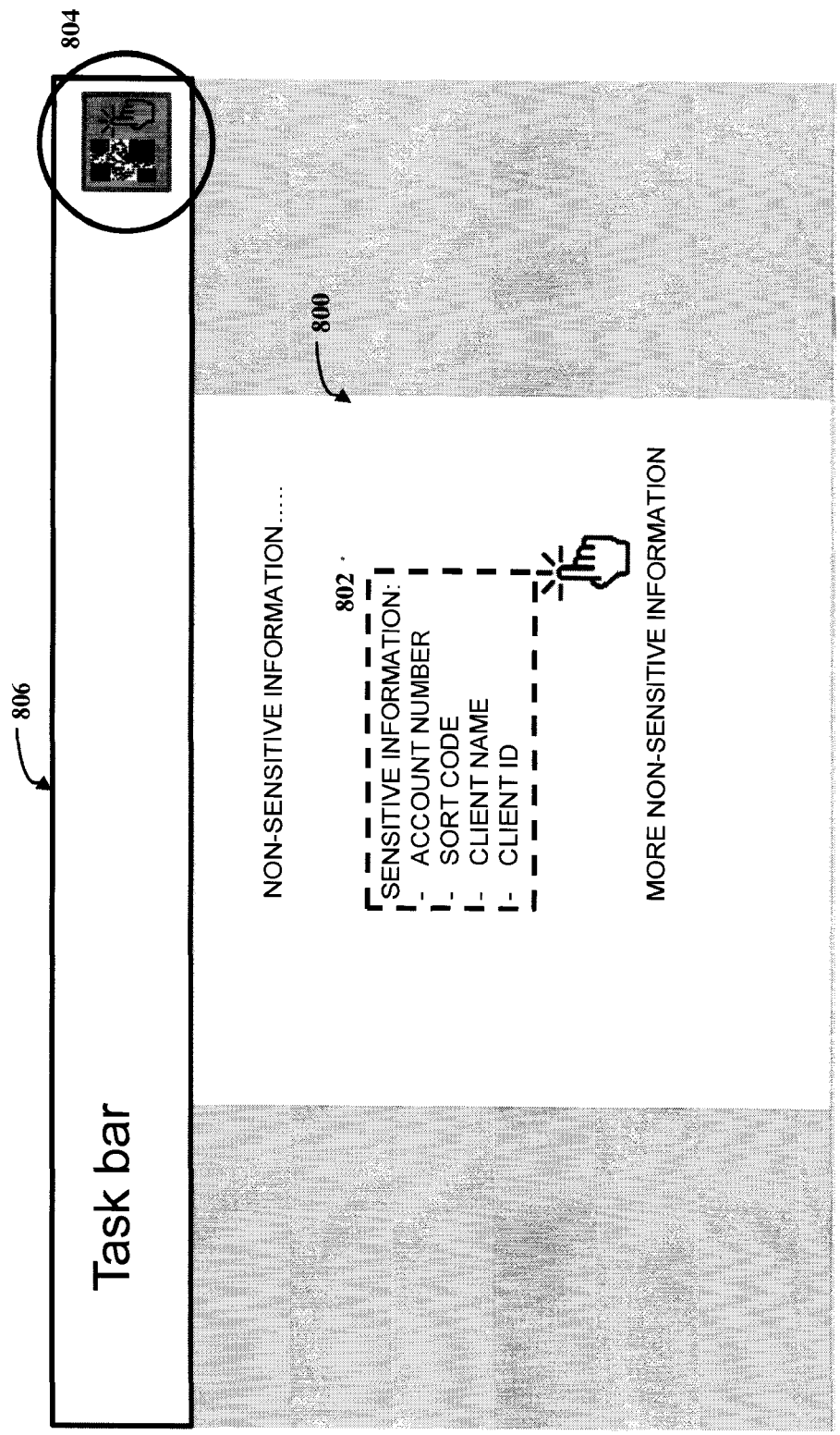
FIGS. 8A and 8B show an example user interface which may be used to generate the hidden data.
Figure 8B:
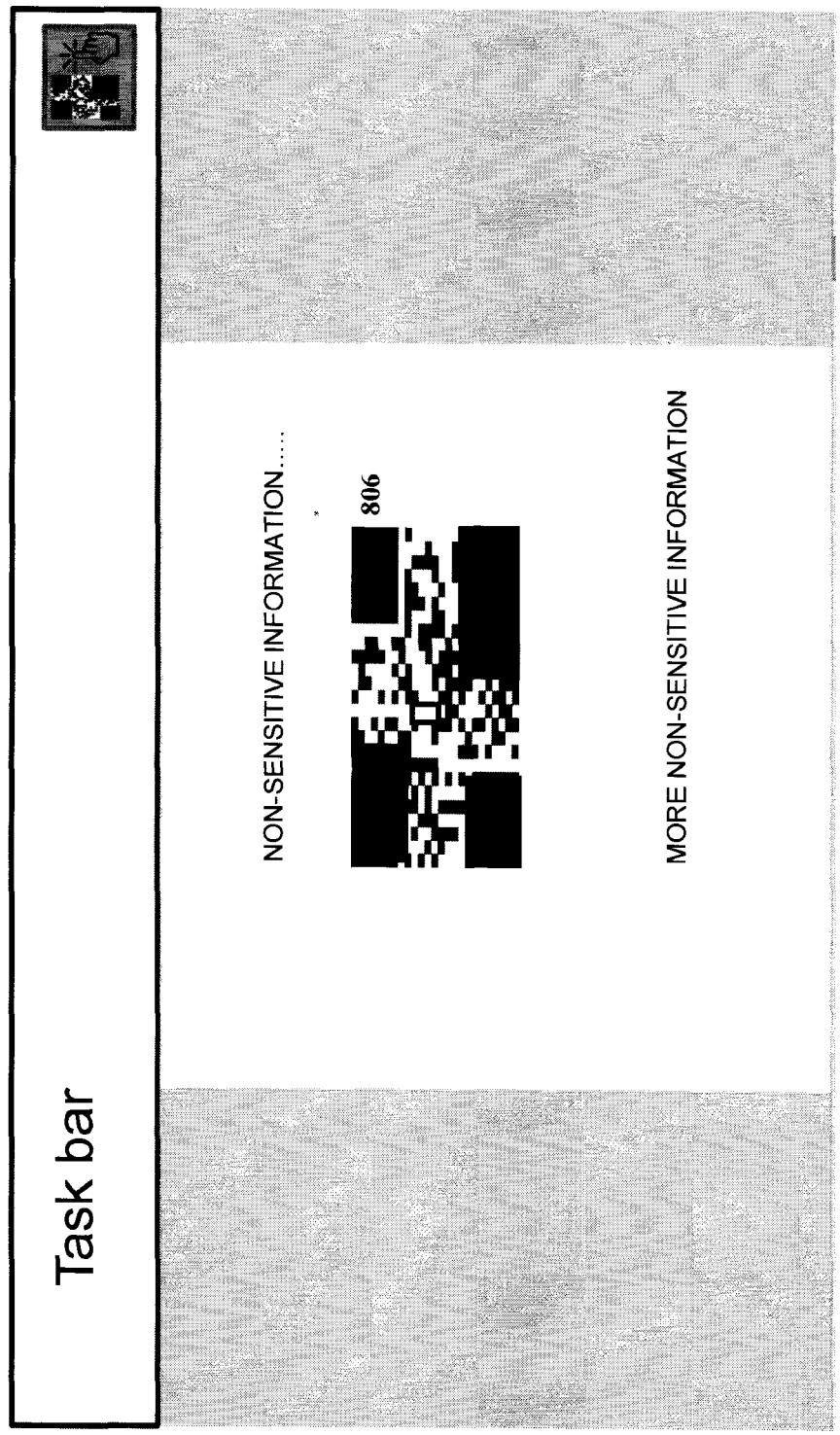

An example of how information may be encrypted by the master device 23 is shown in FIGS. 8A and 8B. In the example shown, a plug-in is installed into a word processing document (e.g. Microsoft Word, Google Docs etc.) that enables a user to select parts of a document to be encrypted. A user may first highlight a section 802 of the document 800, and then select a button 804 on a task bar 806 of the word processing user interface. The highlighted portion of the document is then replaced by a symbol 806. The symbol may be randomly generated by the master device and communicated to the key management server by the master device or the symbol may be randomly generated by the key management server (e.g. in response to a request sent by the master device in response to the user selecting button 804). The key management server may prompt the user of the master device if they wish to upload the symbol and/or identification tag of the symbol to the key management database.

A variety of different rules and policies can be applied to an encryption of a portion of a document. These may include rules on what type of authentication is required to decrypt the content. These rules may include whether two factor authentication or multifactor authentication is required, restrictions on the location where the content could be decrypted or a time window when the content could be decrypted.

These encryption rules could be set in a number of different ways. In a first example, they may be set within the document editor by incorporating functionality in the document editor (e.g. within an application such as Microsoft Word or Adobe Acrobat) or as an add-on to the document editor to enable the user of the document editor to set the rules and policies on a selected portion of the document. In such an example, the user can also open an existing document and modify or revoke existing rules as well as add additional rules to portions of the document from within the same document editor. Where this approach is used, the control of the document remains within the document and does not rely on an external portal. This means that when a user receives a document, they can change the access control from within the document without needing to sign into an external portal and this reduces the time taken to access a document (e.g. in terms of mouse clicks and network traffic) and removes user friction.

In a second example, the encryption rules may be set from a centralized admin portal. The centralized admin portal may be accessed from any device (e.g. via a network connection to the portal). It integrates with the master device, and key management server so that any changes made to the access control filter through appropriately and are updated in the document itself. The use of a centralized admin portal provides the ability to allow admin users as well as users with appropriate privileges to set, revoke and modify the rules and policies on existing documents. This can be achieved either through the document then being uploaded into the centralized admin portal or by applying the policy through a file store (e.g. wherever the documents may be stored) that is connected to the admin portal to automatically apply the policy to existing documents without having to open the document.

The decision on what parts of the document need to be encrypted and what rules need to be applied to the encrypted content may be manual or automated. In the manual scenario, the user or administrator can set these rules. These rules may include whether two factor authentication or multifactor authentication is required, restrictions on the location where the content could be decrypted or a time window when the content could be decrypted. In the automated scenario, artificial intelligence can be used to detect sensitive parts of the document (e.g. personal information) and the encryption and rules can be automatically applied to the document with no user intervention. This can be done either (i) at a document level, where the AI and encryption are applied by the document editor when a document is opened or created; or (ii) at the file storage level where the rules can be applied to all documents stored in the file store so that the sensitive data is automatically encrypted in bulk without the individual documents being opened by an editor; or (iii) this can also be applied at the network level, where documents being transmitted over a network or out of a network have the rules applied to it by network elements (e.g. gateways) to ensure, for instance, that all documents transmitted to users outside of an organisation have personal data encrypted at the boundary of the enterprise. It will be appreciated that in some implementations, the automated application of the encryption may be performed at more than one level (e.g. at any combination of the document level, file storage level and network level).

In another example, instead of encrypting information and replacing it with a symbol, as described in methods 100, 600 and 700-730, the hidden information may comprise a watermark or other information about the data item into which the symbol is inserted.

Whilst in the examples described above, a data item comprises only a single marker, it will be appreciated that a data item may comprise more than one marker with each marker corresponding to a different element of hidden information (and hence having a corresponding decryption key). A single decryption key or multiple decryption keys may be used when there is a plurality of markers.

The methods described above provide increased data security through the use of a marker to replace a part of a data item. If the client device, or user of the client device, is authorized, the client device is able to use the marker to access both a decryption key and the encrypted data that has been replaced in the data item by the marker; however, any decryption of the encrypted data is only temporary and is only revealed to a user for the duration of an output session.

Figure 9:
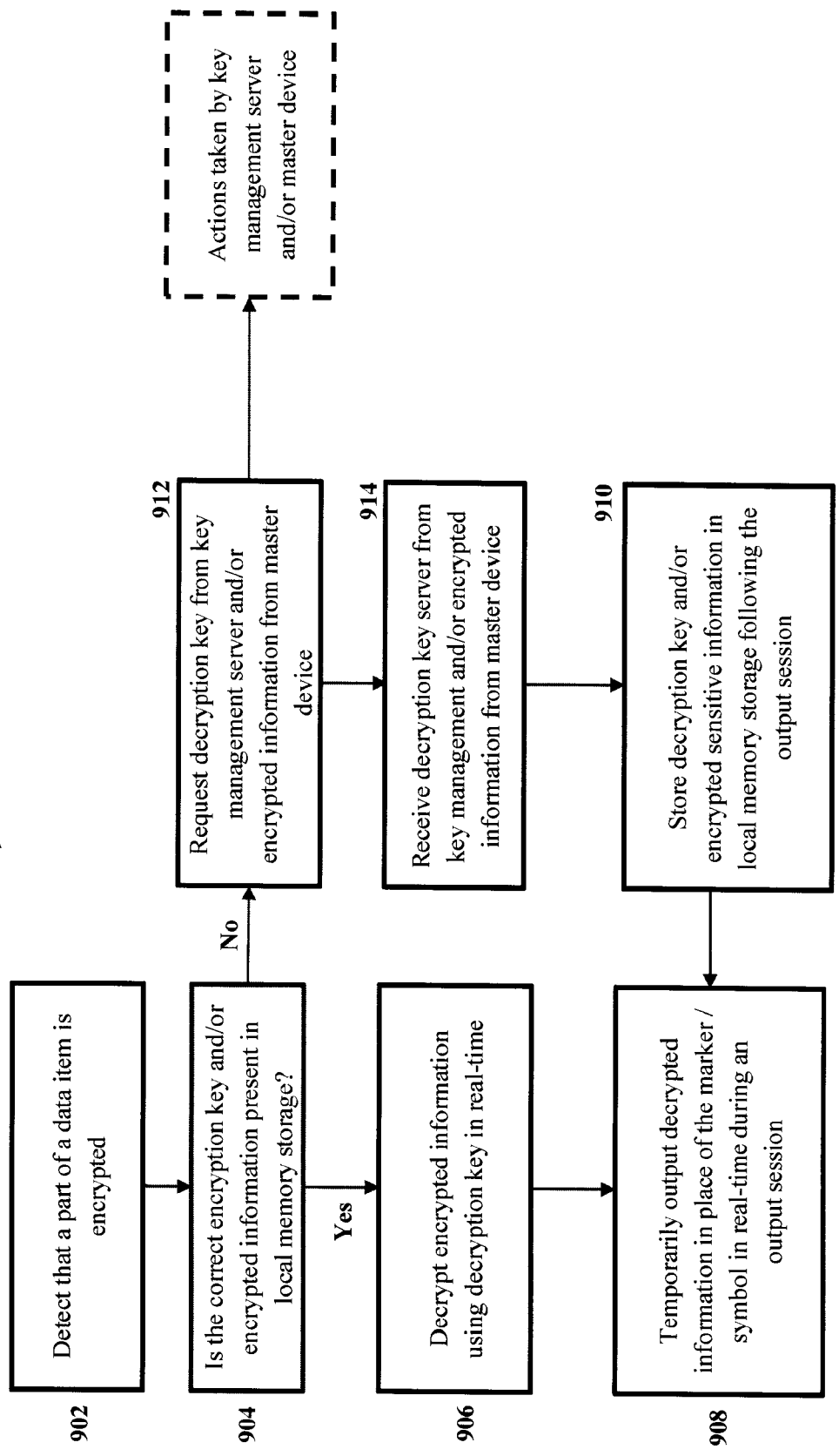
FIG. 9 is a flow diagram of another example method of providing access to encrypted or hidden data which is a variation on that shown in FIG. 1.

In a further variation of the methods described above, there may be some instances in which a user retains access to the decrypted data after the methods described above have been performed, e.g. where two devices are used in the authentication process (e.g. as described above with reference to FIGS. 7A-7D). In some examples, whilst the decryption key is discarded following the output session (in block 116 or block 612), the decrypted information may be retained. Alternatively, the decrypted information may be discarded but the decryption key and the encrypted information may be retained (in block 116 or block 612). The flow diagram in FIG. 9 shows a variation of the method 100 (as shown in FIG. 1) where the decryption key and/or encrypted information are stored within memory of the client device following the termination of an output session. Following the detection of part of a data item that is encrypted at block 902 which may involve the detection of a marker within the data item, the client device checks local memory storage for the correct decryption key and/or encrypted information at block 904 associated with the detected marker. In this example, the encrypted information may be stored within the marker. If the client device does not have the correct decryption key and/or encrypted information, the client device may request and receive the decryption key and/or encrypted information from the key management server and/or master device in blocks 912 and 914 in the same manner as described in method 100. In this example, the received decryption key and/or encrypted information may be stored in the local memory storage of the client device at block 910. Thus, if the client device were to detect the same marker at a future instance, the client device would not need to request the decryption key and/or encrypted information. If the decryption key and encrypted information are stored in the local memory of the client device, the client device proceeds to block 906 and 908 decrypting the encrypted information and temporarily outputting the decrypted information in real-time during an output session. It will be appreciated that whilst FIG. 9 is shown as a variation of FIG. 1, in other examples, the methods of any of FIGS. 6 and 7A-7D may be modified in a similar manner. In various examples, the long-term access to the decrypted information may be dependent upon an access level of the client device. In an example where multiple access levels are used (e.g. as described above), one or more of the access levels may result in the triggering of the discarding of the decryption key and decrypted information and another of the access levels may cause this discarding operation (e.g. block 116 or block 612) to be omitted (e.g. with a particular access level, the discarding may not be triggered).

Figure 10:
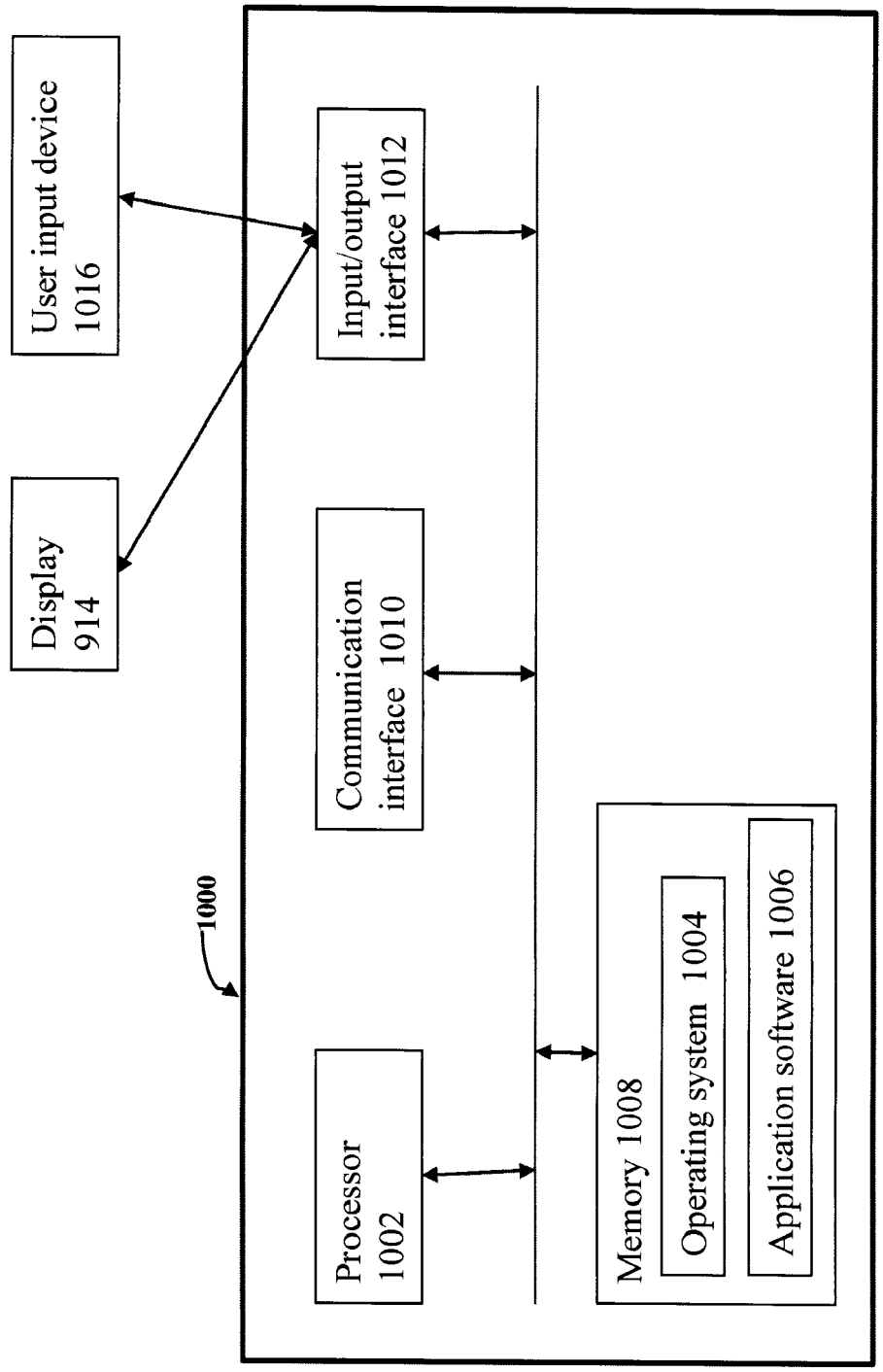
FIG. 10 is a schematic diagram of an example computing device.

The client device 21, 21A, 21B, key management server 22, master device 23 and computing device 25 may be implemented as any form of a computing and/or electronic device, and in which embodiments of the methods described above may be implemented. The computing-based device 1000, as shown in FIG. 10, may comprise one or more processors 1002 which may be microprocessors, controllers or any other suitable type of processors for processing computer executable instructions to control the operation of the device in order to implement part or all of one of the methods described herein. Platform software comprising an operating system 1004, or any other suitable platform software may be provided at the computing-based device to enable application software 1006 arranged to implement some or all of the methods described herein to be executed on the device.

The computer executable instructions may be provided using any computer-readable media that is accessible by computing based device. Computer-readable media may include, for example, computer storage media such as memory 1008 and communications media. Computer storage media, such as memory 1008, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. The computer storage media (e.g. memory 1008) may be within the computing-based device (as shown in FIG. 10) or the storage may be distributed or located remotely and accessed via a network or other communication link (e.g. via a communication interface 1010 within the computing device).

The computing-based device 1000 may also comprise an input/output controller 1012 arranged to output display information to a display device 1014 which may be separate from or integral to the computing-based device 1000. The display information may provide a graphical user interface. The input/output controller 1012 may also be arranged to receive and process input from one or more devices, such as a user input device 1016 (e.g. a mouse or a keyboard). In an embodiment the display device 1014 may also act as the user input device 1016 if it is a touch display device. The input/output controller 1012 may also output data to devices other than the display device and receive input from devices other than the user input device 1016 (e.g. from a camera, microphone, etc.).

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method comprising:
    displaying a data item on a display of a client device;
    in response to determining that a part of the data item is encrypted, sending a request for a decryption key associated with the part of the data item from the client device to a remote computing device;
    in response to receiving the decryption key associated with the part of the data item and obtaining the encrypted data, decrypting the encrypted part of the data item using the decryption key, wherein the decryption is performed by the client device;
    temporarily outputting, for a period of an output session, the decrypted data in a position of the encrypted part of the data item on the display; and
    discarding the decryption key and decrypted data after the output session.

2. The method according to claim 1, wherein the output session is terminated when a window that is showing the decrypted information on the display of the client device is closed.

3. The method according to claim 1, wherein temporarily outputting, for a period of an output session, the decrypted data in a position of the encrypted part of the data item comprises:
    temporarily overlaying, for the period of the output session, the decrypted data over the encrypted part of the data item.

4. The method according to claim 1, wherein temporarily outputting, for a period of an output session, the decrypted data in a position of the encrypted part of the data item comprises:
    temporarily replacing, for the period of the output session, the encrypted part of the data item with the decrypted data.

5. The method according to claim 1, further comprising:
    determining that a part of a data item is encrypted.

6. The method according to claim 1, wherein determining that a part of a data item is encrypted comprises:
    detecting the marker in a data item, the data item comprising the marker and a portion of unencrypted information.

7. The method according to claim 6, further comprising:
    sending a request for the encrypted data associated with the marker.

8. The method according to claim 7, wherein temporarily replacing, for a period of an output session, the encrypted part of the data item with the decrypted data comprises:
    temporarily outputting, for a period of an output session, the data item with decrypted data in place of the marker.

9. The method according to claim 6, wherein the request for the decryption key comprises the marker or an identifier determined from the marker.

10. The method according to claim 1, wherein determining that a part of a data item is encrypted comprises:
    detecting a portion of encrypted data within the data item.

11. The method according to claim 10, wherein the portion of encrypted data that corresponds to the part of the data item is stored within the marker in the data item.

12. The method according to claim 1, further comprising:
    storing one or more of the decryption key, the encrypted data and/or the decrypted data.

13. A computing device comprising:
    a processor;
    a display; and
    memory arranged to store device-executable instructions that, when executed by the processor, cause the computing device to:
    display a data item on a display of a client device;
    in response to determining that a part of the data item is encrypted, send a request for a decryption key associated with the part of the data item to a remote computing device;
    in response to receiving the decryption key associated with a marker the part of the data item and obtaining the encrypted data, decrypt the encrypted part of the data item using the decryption key;
    temporarily output, for a period of an output session, the decrypted data in a position of the encrypted part of the data item on the display; and
    discard the decryption key and decrypted data after the output session.

14. The computing device according to claim 13, wherein the output session is terminated when a window showing the decrypted information on the display of the client device is closed.

15. The computing device according to claim 14, further comprising:
    temporary memory allocated to the output session and arranged to store the decryption key and the decrypted data, and wherein discarding the decryption key and decrypted data after the output session comprises clearing the temporary memory following termination of the output session.

16. The computing device according to claim 13, further comprising:

a system including the remote computing device, wherein the remote computing device performs key management operations.

\* \* \* \* \*